US012572973B2

(12) United States Patent
      Dissanayake

(10) Patent No.:    US 12,572,973 B2
(45) Date of Patent:        Mar. 10, 2026

(54) ARTIFICIAL INTELLIGENCE-BASED SYSTEMS AND METHODS FOR PROVIDING PERSONALIZED SKIN PRODUCT RECOMMENDATIONS

(71) Applicant: The Procter & Gamble Company, Cincinnati, OH (US)

(72) Inventor: Dissanayake Mudiyanselage Mahathma Bandara Dissanayake, Mason, OH (US)

(73) Assignee: The Procter & Gamble Company, Cincinnati, OH (US)

( * ) Notice:     Subject to any disclaimer, the term of this patent is extended or adjusted under 35 U.S.C. 154(b) by 199 days.

(21) Appl. No.: 18/515,427

(22) Filed:     Nov. 21, 2023

(65)                Prior Publication Data
      US 2025/0166040 A1     May 22, 2025

(51) Int. Cl.
      *G06Q 30/00*         (2023.01)
      *G06F 40/40*         (2020.01)
      *G06Q 30/0204*       (2023.01)
      *G06Q 30/0601*       (2023.01)
      *G06T 11/40*         (2006.01)
(52) U.S. Cl.
      CPC ......... *G06Q 30/0631* (2013.01); *G06F 40/40* (2020.01); *G06Q 30/0204* (2013.01); *G06T 11/40* (2013.01)
(58) Field of Classification Search
      CPC .............................................. G06Q 30/06–08
      See application file for complete search history.

(56)                References Cited

U.S. PATENT DOCUMENTS

| | | | |
|---|---|---|---|
| 10,675,231 | B2 | 6/2020 | Smyth |
| 10,806,686 | B2 | 10/2020 | Smyth |
| 10,952,949 | B2 | 3/2021 | Smith, III et al. |

(Continued)

OTHER PUBLICATIONS

Ditzler, Gregory, et al., "Multi-Layer and Recursive Neural Networks for Metagenomic Classification", IEEE Transactions on Nanobioscience, vol. 14, No. 6, Sep. 2015, pp. 608-616 (Year: 2015).*

(Continued)

*Primary Examiner* — Ethan D Civan
(74) *Attorney, Agent, or Firm* — Alexandra S. Anoff

(57)                ABSTRACT

Artificial intelligence-based systems and methods are described for providing personalized skin product recommendations. Natural language data of a user is received using a conversation engine, such as a generative pretrained transformer AI model. The natural language data is input into a synthetic image generation model for generating a digital twin image depicting skin condition(s). A product recommendation model inputs the digital twin image and/or phenotype and/or demographic classifications of the user, and outputs a skin care product recommendation for the user. An image simulation model inputs the product recommendation, the digital twin image and phenotype and/or demographic classifications of the user to output a simulated image of the user having one or more graphical enhancements. The simulated image may be displayed to the user on display screen along with natural language data describing the simulated image as depicted skin as predicted to appear following treatment with the skin care product.

20 Claims, 8 Drawing Sheets

(56) References Cited

U.S. PATENT DOCUMENTS

| | | | |
|---|---|---|---|
| 10,952,950 | B2 | 3/2021 | Smith, III et al. |
| 11,179,301 | B2 | 11/2021 | Smith, III |
| 11,185,486 | B2 | 11/2021 | Smyth |
| 11,202,744 | B2 | 12/2021 | Smyth |
| 11,202,746 | B2 | 12/2021 | Smith, III |
| 11,311,470 | B2 | 4/2022 | Smith, III |
| 11,737,965 | B2 | 8/2023 | Smith, III |
| 11,737,966 | B2 | 8/2023 | Smith, III |
| 11,748,800 | B1 * | 9/2023 | Yuan ...................... G16H 50/70 |
| | | | 705/26.7 |
| 11,807,829 | B2 | 11/2023 | Vinson |
| 11,932,827 | B2 | 3/2024 | Biiliauw |
| 2016/0310387 | A1 | 10/2016 | Smith, III |
| 2016/0310388 | A1 | 10/2016 | Smith, III et al. |
| 2016/0310390 | A1 | 10/2016 | Smith, III |
| 2022/0051114 | A1 * | 2/2022 | Lyman ................... G16H 50/20 |
| 2023/0146840 | A1 * | 5/2023 | Baldauf-Lenschen ...................... |
| | | | G16H 10/20 |
| | | | 703/11 |
| 2023/0187055 | A1 | 6/2023 | Dissanayake |
| 2023/0316374 | A1 | 10/2023 | Yogaraj et al. |

OTHER PUBLICATIONS

PCT Search Report and Written Opinion for PCT/US2024/056468 dated Feb. 27, 2025, 13 pages.

* cited by examiner

Figure 2A:
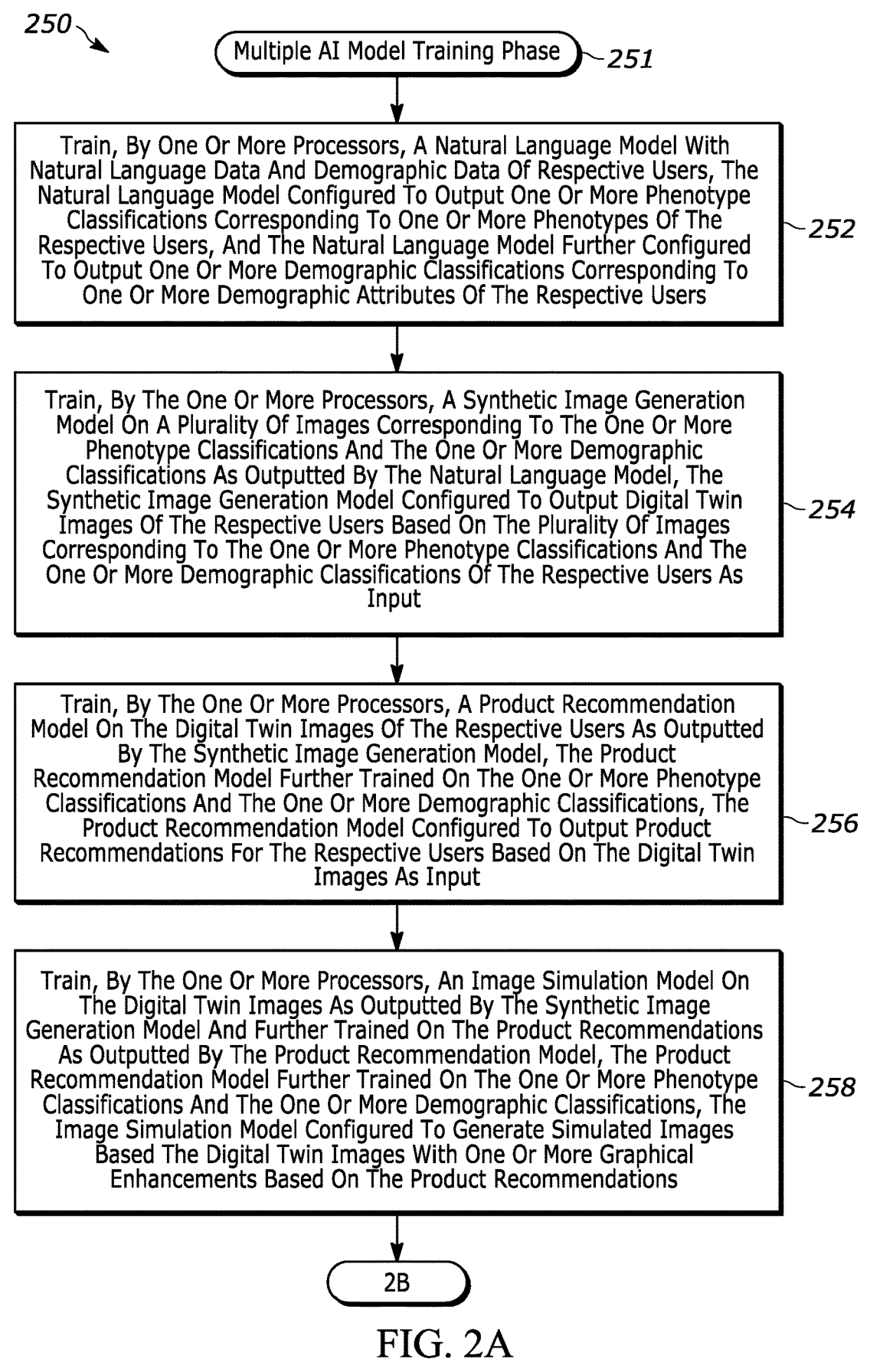

250

( Multiple AI Model Training Phase )~251

Train, By One Or More Processors, A Natural Language Model With Natural Language Data And Demographic Data Of Respective Users, The Natural Language Model Configured To Output One Or More Phenotype Classifications Corresponding To One Or More Phenotypes Of The Respective Users, And The Natural Language Model Further Configured To Output One Or More Demographic Classifications Corresponding To One Or More Demographic Attributes Of The Respective Users
~252

Train, By The One Or More Processors, A Synthetic Image Generation Model On A Plurality Of Images Corresponding To The One Or More Phenotype Classifications And The One Or More Demographic Classifications As Outputted By The Natural Language Model, The Synthetic Image Generation Model Configured To Output Digital Twin Images Of The Respective Users Based On The Plurality Of Images Corresponding To The One Or More Phenotype Classifications And The One Or More Demographic Classifications Of The Respective Users As Input
~254

Train, By The One Or More Processors, A Product Recommendation Model On The Digital Twin Images Of The Respective Users As Outputted By The Synthetic Image Generation Model, The Product Recommendation Model Further Trained On The One Or More Phenotype Classifications And The One Or More Demographic Classifications, The Product Recommendation Model Configured To Output Product Recommendations For The Respective Users Based On The Digital Twin Images As Input
~256

Train, By The One Or More Processors, An Image Simulation Model On The Digital Twin Images As Outputted By The Synthetic Image Generation Model And Further Trained On The Product Recommendations As Outputted By The Product Recommendation Model, The Product Recommendation Model Further Trained On The One Or More Phenotype Classifications And The One Or More Demographic Classifications, The Image Simulation Model Configured To Generate Simulated Images Based The Digital Twin Images With One Or More Graphical Enhancements Based On The Product Recommendations
~258

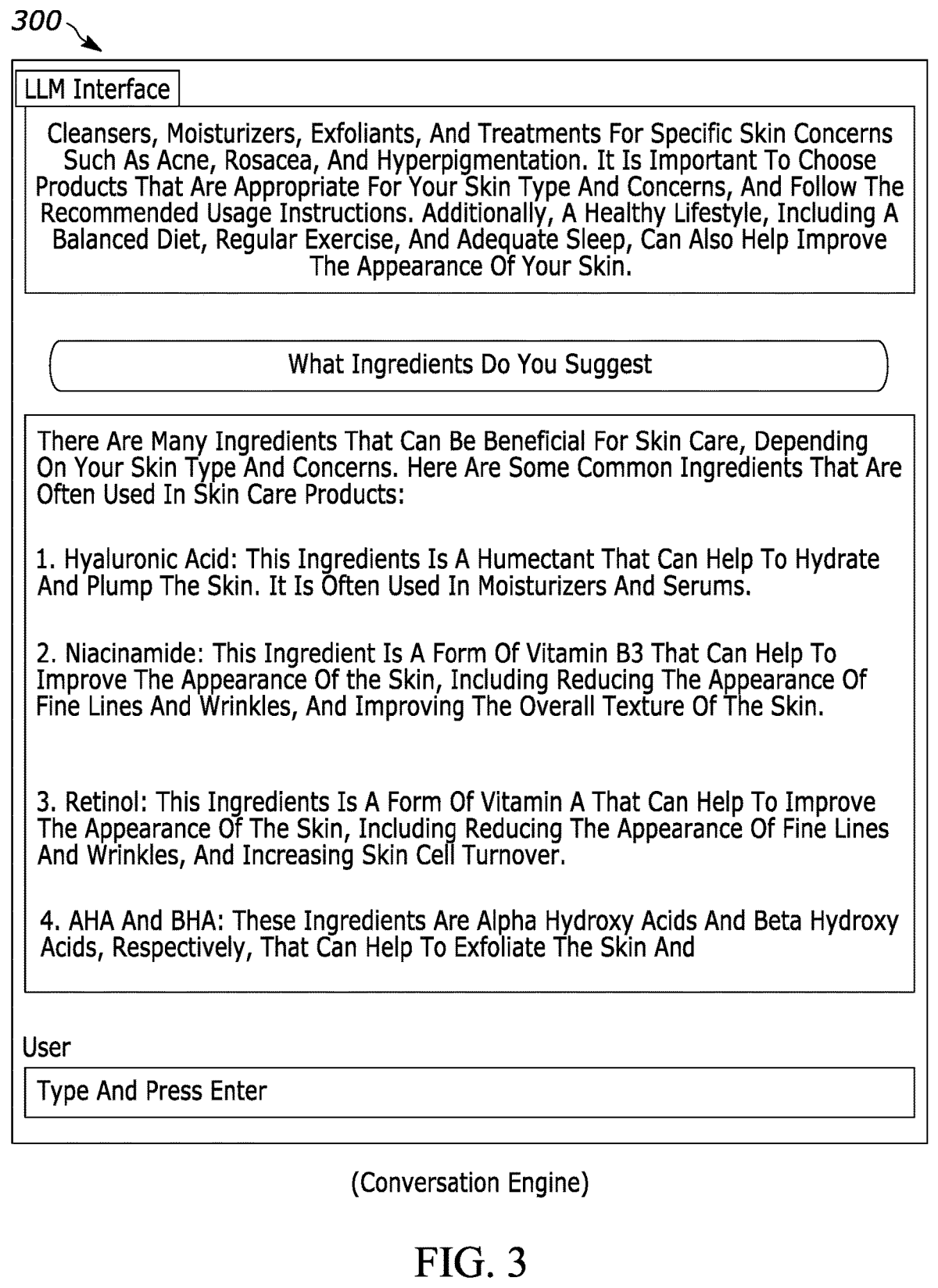

| LLM Interface |

Cleansers, Moisturizers, Exfoliants, And Treatments For Specific Skin Concerns Such As Acne, Rosacea, And Hyperpigmentation. It Is Important To Choose Products That Are Appropriate For Your Skin Type And Concerns, And Follow The Recommended Usage Instructions. Additionally, A Healthy Lifestyle, Including A Balanced Diet, Regular Exercise, And Adequate Sleep, Can Also Help Improve The Appearance Of Your Skin.

What Ingredients Do You Suggest

There Are Many Ingredients That Can Be Beneficial For Skin Care, Depending On Your Skin Type And Concerns. Here Are Some Common Ingredients That Are Often Used In Skin Care Products:

1. Hyaluronic Acid: This Ingredients Is A Humectant That Can Help To Hydrate And Plump The Skin. It Is Often Used In Moisturizers And Serums.

2. Niacinamide: This Ingredient Is A Form Of Vitamin B3 That Can Help To Improve The Appearance Of the Skin, Including Reducing The Appearance Of Fine Lines And Wrinkles, And Improving The Overall Texture Of The Skin.

3. Retinol: This Ingredients Is A Form Of Vitamin A That Can Help To Improve The Appearance Of The Skin, Including Reducing The Appearance Of Fine Lines And Wrinkles, And Increasing Skin Cell Turnover.

4. AHA And BHA: These Ingredients Are Alpha Hydroxy Acids And Beta Hydroxy Acids, Respectively, That Can Help To Exfoliate The Skin And User Type And Press Enter (Conversation Engine)

FIG. 3

Digital Twin Images

Digital Twin

202aralt

202a_dtalt

Simulated Imaged (Enhanced)

202a_dt1alt

202apalt

202at2

3

ARTIFICIAL INTELLIGENCE-BASED SYSTEMS AND METHODS FOR PROVIDING PERSONALIZED SKIN PRODUCT RECOMMENDATIONS

FIELD

The present disclosure generally relates to artificial intelligence (AI)-based systems and methods, and, more particularly, to AI-based systems and methods for providing personalized skin product recommendations.

BACKGROUND

Human skin is unique for given individuals, where variations of the skin can be based on, e.g., race, age, exposure to the sun, etc. Individuals can have one or more skin issues, conditions, or concerns, including, but not limited to, e.g., pigmented spots, wrinkles and/or fine lines, acne, pores, sagging and/or loss of elasticity, uneven texture, skin thinning, dryness, oiliness, sensitivity, uneven skin tone, eczema, and/or dermatitis. Such uniqueness and diversity of the skin create difficulties for respective individuals to identify products that can treat or otherwise mitigate their respective unique combination of concerns. Moreover, once a product is identified, it can be difficult to determine what kind of difference or impact such a product can make to a given individual's skin.

A problem can arise in a user attempting to self-identify causes of these skin conditions, issues, or concerns. This can lead to problems involving incorrect identification. Incorrect identification can, in turn, can lead to ineffective treatment. For example, a product designed to treat one skin condition, issue, or concern can be incorrectly applied in the attempt to treat a different skin condition, issue, or concern, which, on the one hand, can at least be ineffective, and on the other hand can be potentially dangerous (e.g., application of a prescription medication that is different than what the medication is intended for).

These problems can be exacerbated given the complexity of skin types, especially when considered across different users, each of whom may be associated with different demographics, races, and/or ethnicities. This creates a problem in the diagnosis and treatment of various human skin conditions and characteristics. For example, prior art methods, including personal consumer product trials can be time consuming or error prone (and possibly negative). In addition, a user may attempt to empirically experiment with various products or techniques, but without achieving satisfactory results and/or causing possible negative side effects, impacting the health or otherwise visual appearance of his or her skin.

Still further, in order to acquire certain skin care products, a user may need to visit a skin care specialist, such as a dermatologist. But such an approach can be problematic, time consuming, and, perhaps, unavailable if a user is unable able to access such specialist outside of a given medical coverage plan. In addition, various conventional computer-related techniques are known for identify specific skin issues, but such conventional computer-related techniques fail to capture specific needs of a given user to address specific skin concerns in a manner similar to a user's in-person visit to a skin specialist, such as a dermatologist. Still further, such conventional computer-related techniques also typically require the disclosure and/or transmission of personally identifiable information (PII), such as sensitive health information and/or images of the user, which may require a closeup image of the user's skin. The disclosure or transmission of such PH can create security risks to the underlying computing system, where such information can be at risk of interception and/or exploitation by nefarious actors.

For the foregoing reasons, there is a need for AI-based systems and methods for providing personalized skin product recommendations, as describe herein.

SUMMARY

Generally, as described herein, AI-based systems and methods for providing personalized skin product recommendations. Such artificial intelligence-based systems provide an artificial intelligence (AI) based solution, which includes a large language model (LLM) such as a conversant generative pretrained transformer (GPT), that is national language or a conversation engine, for conversing with a specific user, which can be used for overcoming specific user problems that arise from the difficulties in identifying and treating various endogenous and/or exogenous factors or attributes affecting the health of human skin. For example, this can include generation or otherwise determination of a user-specific recommendation for a skin product with efficacy for therapeutically and/or dermatologically treating a predicted user-specific skin ailment and/or otherwise skin condition.

The AI-based systems and methods as described herein allow a user to engage in a natural language conversation, similar to how a user would converse with a skin specialist, such as a dermatologist. In various aspects, the AI-based systems and methods use multiple AI models to provide natural language processing (NLP), user-specific skin issue identification, and/or product recommendations specific to the user and the user's identified skin issue. For example, a first AI model may comprise a conversation engine, where the AI model communicates with a user to ask questions and receive information, e.g., which can include in an iterative implementation, in order to receive sufficient information for use as input into a second AI model. For example, the first AI model may initiate a conversation with a user via a GPT-type interface. The first AI model may query the user with questions asked by a skin specialist (e.g., a dermatologist), where the first AI model is trained on dermatologist specific information, including for example, dermatologist specific information including text-based information and/or voice information specific to the field of dermatology. Natural language data (e.g., text and/or voice data of the user) may be received from the user and be input into a second AI model trained on such data and configured to output user specific demographic classifications and/or user-specific demographic classifications defining the user (e.g., the user's gender, age, skin color, severity of skin condition, etc.). For example, a type of classification may include the severity of acne, and such information may be provided to the second AI model as natural language data received from the user regarding a range of severity (e.g., mild, moderate, or severe acne). Such range may be ordinal based on the classes themselves and/or may be converted into a numeric scale (e.g., 1-10) for use with training and/or output of the second AI model.

A third AI model may then use as input such user specific demographic classifications and/or user-specific demographic classifications to generate a synthetic image representing the user. Such synthetic image may comprise, or be based on, a digital twin image generated for a specific user that represents the specific user, e.g., having a same skin color, hair color, etc. A specific issue (e.g., a specific skin issue) as identified for the user may then be applied (e.g., superimposed or overlayed) to the digital twin image. In this way the skin issue identified by the natural language data provided by the user can be used to generate an image depicting the skin issue in a user-specific digital twin image. In some aspects, an AI model may be trained with pixel data of potentially 10,000s (or more) images depicting skin or skin regions of respective individuals having various skin issues. For example, the images may comprise example images of respective users' skin comprising pixels or pixel data indicative of spots (e.g., hemoglobin and/or melanin related spots) or other attributes/conditions of a human skin. The AI model may generate or update the digital twin image to include, for example, pixel data associated with the skin issue identified for the user. Importantly, the user-specific digital twin image may be generated for the user without the user providing an actual image of himself or herself. Instead, the natural language data (e.g., text/voice information) is received from the user from a GPT type prompt such that the digital twin image is generated from natural language data alone.

The digital twin image may be provided to a fourth AI model, which is trained to recommend a product for addressing a skin issue or otherwise condition (e.g., skin acne). In some aspects, the fourth AI model may generate a user-specific simulated image based the user-specific digital twin image and the user-specific product recommendation. The user-specific simulated image may graphically depict the user-specific digital twin image graphically enhanced based on the user-specific product recommendation. In various aspects, the graphically enhanced simulated image may depict a predictive effect and/or efficacy of the recommended skin product on the digital twin image. That is, such predictive effect and/or efficacy may comprise an estimated skin depiction superimposed or otherwise rendered onto or as part of a digital twin image to show effect of product on skin. For example, in various implementations, such rendering may include graphical representations, overlays, annotations, and the like for addressing a skin issue and/or feature in the pixel data. In various aspects, the user-specific digital twin image and/or simulated enhanced image may be output or displayed on display screen, e.g., for review by the user. Additionally, or alternatively, natural language data may be output to the user, e.g., via the display screen to describe the user-specific product recommendation.

More specifically, as described herein, an artificial intelligence (AI)-based system configured to provide personalized skin product recommendations is disclosed. The AI-based system may comprise one or more processors, and one or more memories communicatively coupled to the one or more processors. The AI-based system may further comprise an application (app) stored in the one or more memories and comprising computing instructions configured to execute on the one or more processors. The AI-based system may further comprise a natural language model, accessible by the app, and trained with natural language data and demographic data of respective users. The natural language model may be configured to output one or more phenotype classifications corresponding to one or more phenotypes of the respective users. The natural language model may further be configured to output one or more demographic classifications corresponding to one or more demographic attributes of the respective users. The AI-based system may further comprise a synthetic image generation model, accessible by the app, and trained on a plurality of images corresponding to the one or more phenotype classifications and the one or more demographic classifications as outputted by the natural language model. The synthetic image generation model may be configured to output digital twin images of the respective users based on the plurality of images corresponding to the one or more phenotype classifications and the one or more demographic classifications of the respective users as input.

The AI-based system may further comprise a product recommendation model, accessible by the app, and trained on the digital twin images of the respective users as outputted by the synthetic image generation model. The product recommendation model may further be trained on the one or more phenotype classifications and the one or more demographic classifications. The product recommendation model may be configured to output product recommendations for the respective users based on the digital twin images, the one or more phenotype classifications, and the one or more demographic classifications as input. The AI-based system may further comprise an image simulation model, accessible by the app, and trained on the digital twin images as outputted by the synthetic image generation model and further trained on the product recommendations as outputted by the product recommendation model. The product recommendation model may be further trained on the one or more phenotype classifications and the one or more demographic classifications. The image simulation model may be configured to generate simulated images based the digital twin images with one or more graphical enhancements based on the product recommendations.

The computing instructions of the app when executed by the one or more processors, cause the one or more processors to: (a) receive user-specific natural language data of a user, the natural language data defining user-specific phenotype information and user-specific demographic data of the user, (b) input the user-specific natural language data into the natural language model, wherein the natural language model generates one or more user-specific phenotype classifications and one or more user-specific demographic classifications defining the user, (c) input the one or more user-specific phenotype classifications and the one or more user-specific demographic classifications into the synthetic image generation model, wherein the synthetic image generation model generates a user-specific digital twin image of the user, (d) input the user-specific digital twin image of the user, the one or more phenotype classifications of the user, and the one or more demographic classifications of the user into the product recommendation model, wherein the product recommendation model generates a user-specific product recommendation for the user, the user-specific product recommendation designed to address at least one issue identified in the user-specific digital twin image or the one or more user-specific phenotype classifications, (e) input the user-specific digital twin image, the user-specific product recommendation, the one or more phenotype classifications of the user, and the one or more demographic classifications of the user into the image simulation model, wherein the image simulation model generates a user-specific simulated image based the user-specific digital twin image and the user-specific product recommendation, the user-specific simulated image graphically depicting the user-specific digital twin image graphically enhanced based on the user-specific product recommendation, and (f) output natural language data to the user describing the user-specific product recommendation; and (g) display, on a display screen, the user-specific simulated image.

In addition, as described herein, artificial intelligence (AI)-based method is disclosed for providing personalized skin product recommendations. The AI-based method comprises implementing a multiple AI model training phase comprising: training, by one or more processors, a natural language model with natural language data and demographic data of respective users, the natural language model configured to output one or more phenotype classifications corresponding to one or more phenotypes of the respective users, and the natural language model further configured to output one or more demographic classifications corresponding to one or more demographic attributes of the respective users; training, by the one or more processors, a synthetic image generation model on a plurality of images corresponding to the one or more phenotype classifications and the one or more demographic classifications as outputted by the natural language model, the synthetic image generation model configured to output digital twin images of the respective users based on the plurality of images corresponding to the one or more phenotype classifications and the one or more demographic classifications of the respective users as input; training, by the one or more processors, a product recommendation model on the digital twin images of the respective users as outputted by the synthetic image generation model, the product recommendation model further trained on the one or more phenotype classifications and the one or more demographic classifications, the product recommendation model configured to output product recommendations for the respective users based on the digital twin images, the one or more phenotype classifications, and the one or more demographic classifications as input; training, by the one or more processors, an image simulation model on the digital twin images as outputted by the synthetic image generation model and further trained on the product recommendations as outputted by the product recommendation model, the product recommendation model further trained on the one or more phenotype classifications and the one or more demographic classifications, the image simulation model configured to generate simulated images based the digital twin images with one or more graphical enhancements based on the product recommendations, wherein each of the natural language model, the synthetic image generation model, the product recommendation model, and the image simulation model is stored in one or more memories accessible by an application (app) comprising computing instructions stored in the one or more memories, the one or more memories communicatively coupled to the one or more processors.

The AI-based method further comprises implementing a multiple AI model execution phase comprising: (a) receiving, by the app, user-specific natural language data of a user, the natural language data defining user-specific phenotype information and user-specific demographic data of the user; (b) inputting, by the app, the user-specific natural language data into the natural language model, wherein the natural language model generates one or more user-specific phenotype classifications and one or more user-specific demographic classifications defining the user; (c) inputting, by the app, the one or more user-specific phenotype classifications and the one or more user-specific demographic classifications into the synthetic image generation model, wherein the synthetic image generation model generates a user-specific digital twin image of the user; (d) inputting, by the app, the user-specific digital twin image of the user, the one or more phenotype classifications of the user, and the one or more demographic classifications of the user into the product recommendation model, wherein the product recommendation model generates a user-specific product recommendation for the user, the user-specific product recommendation designed to address at least one issue identified in the user-specific digital twin image or the one or more user-specific phenotype classifications; (e) inputting, by the app, the user-specific digital twin image, the user-specific product recommendation, the one or more phenotype classifications of the user, and the one or more demographic classifications of the user into the image simulation model, wherein the image simulation model generates a user-specific simulated image based the user-specific digital twin image and the user-specific product recommendation, the user-specific simulated image graphically depicting the user-specific digital twin image graphically enhanced based on the user-specific product recommendation; (f) outputting, by the app, natural language data to the user describing the user-specific product recommendation; and (g) displaying, by the app on a display screen, the user-specific simulated image.

Still further, as described herein, a tangible, non-transitory computer-readable medium storing instructions for providing personalized skin product recommendations is disclosed. The instructions, when executed by one or more processors, may cause the one or more processors to implement a multiple AI model training phase comprising: training, by one or more processors, a natural language model with natural language data and demographic data of respective users, the natural language model configured to output one or more phenotype classifications corresponding to one or more phenotypes of the respective users, and the natural language model further configured to output one or more demographic classifications corresponding to one or more demographic attributes of the respective users; training, by the one or more processors, a synthetic image generation model on a plurality of images corresponding to the one or more phenotype classifications and the one or more demographic classifications as outputted by the natural language model, the synthetic image generation model configured to output digital twin images of the respective users based on the plurality of images corresponding to the one or more phenotype classifications and the one or more demographic classifications of the respective users as input; training, by the one or more processors, a product recommendation model on the digital twin images of the respective users as outputted by the synthetic image generation model, the product recommendation model further trained on the one or more phenotype classifications and the one or more demographic classifications, the product recommendation model configured to output product recommendations for the respective users based on the digital twin images, the one or more phenotype classifications, and the one or more demographic classifications as input; training, by the one or more processors, an image simulation model on the digital twin images as outputted by the synthetic image generation model and further trained on the product recommendations as outputted by the product recommendation model, the product recommendation model further trained on the one or more phenotype classifications and the one or more demographic classifications, the image simulation model configured to generate simulated images based the digital twin images with one or more graphical enhancements based on the product recommendations, wherein each of the natural language model, the synthetic image generation model, the product recommendation model, and the image simulation model is stored in one or more memories accessible by an application (app) comprising computing instructions stored in the one or more memories, the one or more memories communicatively coupled to the one or more processors.

The instructions, when executed by one or more processors, may further cause the one or more processors to implement a multiple AI model execution phase comprising: (a) receiving, by the app, user-specific natural language data of a user, the natural language data defining user-specific phenotype information and user-specific demographic data of the user; (b) inputting, by the app, the user-specific natural language data into the natural language model, wherein the natural language model generates one or more user-specific phenotype classifications and one or more user-specific demographic classifications defining the user; (c) inputting, by the app, the one or more user-specific phenotype classifications and the one or more user-specific demographic classifications into the synthetic image generation model, wherein the synthetic image generation model generates a user-specific digital twin image of the user; (d) inputting, by the app, the user-specific digital twin image of the user, the one or more phenotype classifications of the user, and the one or more demographic classifications of the user into the product recommendation model, wherein the product recommendation model generates a user-specific product recommendation for the user, the user-specific product recommendation designed to address at least one issue identified in the user-specific digital twin image or the one or more user-specific phenotype classifications; (e) inputting, by the app, the user-specific digital twin image, the user-specific product recommendation, the one or more phenotype classifications of the user, and the one or more demographic classifications of the user into the image simulation model, wherein the image simulation model generates a user-specific simulated image based the user-specific digital twin image and the user-specific product recommendation, the user-specific simulated image graphically depicting the user-specific digital twin image graphically enhanced based on the user-specific product recommendation; (f) outputting, by the app, natural language data to the user describing the user-specific product recommendation; and (g) displaying, by the app on a display screen, the user-specific simulated image.

In accordance with the above, and with the disclosure herein, the present disclosure includes improvements in computer functionality or in improvements to other technologies at least because the disclosure describes that, e.g., a server, or otherwise computing device (e.g., a user computer device), is improved where the intelligence or predictive ability of the server or computing device is enhanced by multiple AI models trained for natural language processing (NLP) and conversations with a user via a GPT-type interface, for generating and enhancing digital twin images of users, and/or for linking and/generating accurate predictions for real-world product recommendations based on user-specific natural language data. The multiple AI models, executing on the server or computing device are able to more accurately identify, based on natural language data and/or pixel data digital twin images, one or more issues of the user and can output a user-specific product recommendation designed to address the issue (e.g., a given skin issue). That is, the present disclosure describes improvements in the functioning of the computer itself or "any other technology or technical field" because a server or user computing device is enhanced with a plurality of training images (e.g., 10,000s of training images and related pixel data as feature data) and/or natural language data to accurately predict, detect, classify, or determine issues specific to users based on pixel data of a user-specific images having the same identified issues. This improves over the prior art at least because existing systems lack such predictive or classification functionality and are simply not capable of accurately analyzing user-specific natural language data to output a predictive result without the provision of a user specific image.

For similar reasons, the present disclosure relates to improvements to other technologies or technical fields at least because the present disclosure describes or introduces improvements to computing devices in the skin care field and skin care products field, whereby the multiple AI models, executing on the imaging device(s) or computing devices, improves the field of skin care, chemical formulations and/or skin classifications and identification thereof, with digital and/or artificial intelligence based analysis of user specific natural language processing (NLP) data to output a predictive result to address an issue identifiable by the NLP data as related to at least a portion of a skin region of the user.

In addition, the present disclosure relates to improvement to other technologies or technical fields at least because the present disclosure describes or introduces improvements to computing devices in the skin care and/or skin care products field, whereby the trained AI models executing on the imaging device(s) or computing device(s) improve the underlying computer device (e.g., server(s) and/or user computing device), where such computer devices are made more efficient by the configuration, adjustment, or adaptation of a given machine-learning network architecture. For example, in some embodiments, fewer machine resources (e.g., processing cycles or memory storage) may be used by decreasing computational resources by decreasing machine-learning network architecture needed by forgoing the need to receiving images from users. Also, the present disclosure describes generating synthetic images and, at least in some aspects, reducing depth, width, image size, or other image aspects of the synthetic images for machine-learning based dimensionality requirements. Such reduction frees up the computational resources of an underlying computing system, thereby making it more efficient.

Still further, the present disclosure relates to improvement to other technologies or technical fields at least because the present disclosure describes or introduces improvements to computing devices in the field of security. In particular, no image of a given user needs to be transmitted or shared, i.e., without depicting personal identifiable information (PII) of the user, for the AI models to generate and/or output images of users. Such implementation eliminates the need of transmission of private photographs of users across a computer network (where such images may be susceptible of interception by third parties). Such features provide a security improvement, i.e., where the elimination of transmission of PII (e.g., facial features) provides an improvement over prior systems because not data need be transmitted over a network (e.g., the Internet), where data transmission of NLP is more secure and less data intensive than a photographic image of a user. In addition, in some aspects, digital twin images and/or simulated enhanced images may be preprocessed (e.g., cropped or otherwise modified) to define extracted or depicted skin regions of a user. For example, cropped or redacted portions of a digital twin image and/or simulated enhanced image of a user may be used by the AI models described herein. Accordingly, the systems and methods described herein operate without the need for such essential information, which provides an improvement, e.g., a security improvement, over prior system. In addition, the use of cropped images, at least in some embodiments, allows the underlying system to store and/or process smaller data size images, which results in a performance increase to the underlying system as a whole because the smaller data size images require less storage memory and/or processing resources to store, process, and/or otherwise manipulate by the underlying computer system.

In addition, the present disclosure includes applying certain of the claim elements with, or by use of, a particular machine, e.g., an GPT interface, which can interact with or access a natural language model trained on NLP data for generating and enhancing digital twin images with pixel data of user-specific skin issues.

In addition, the present disclosure includes specific features other than what is well-understood, routine, conventional activity in the field, or adding unconventional steps that confine the claim to a particular useful application, e.g., AI-based systems and methods for providing personalized skin product recommendations, as describe herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 2A illustrates an example artificial intelligence (AI)-based method for providing personalized skin product recommendations, in accordance with various embodiments disclosed herein.

FIG. 3 illustrates an example user interface showing a generative pretrained transformer (GPT) interface for capturing natural language data of a user, in accordance with various embodiments disclosed herein.

Figure 1:
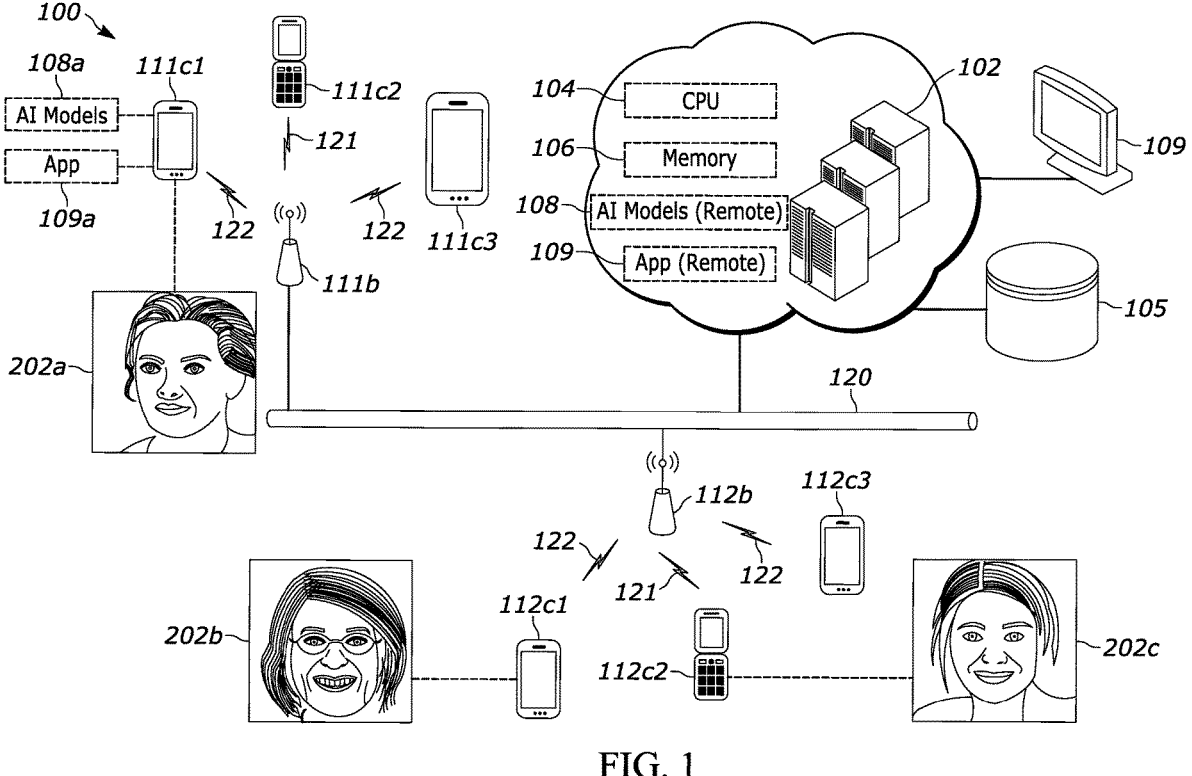
FIG. 1 illustrates an example artificial intelligence (AI)-based system configured to provide personalized skin product recommendations, in accordance with various embodiments disclosed herein.

The Figures depict preferred embodiments for purposes of illustration only. Alternative embodiments of the systems and methods illustrated herein may be employed without departing from the principles of the invention described herein.

DETAILED DESCRIPTION OF THE INVENTION

The disclosure herein provides a multiple artificial intelligence (AI) model based solution for a user to converse with a natural language model to provide natural language data defining a skin issue(s), condition(s), or concern(s), including, but not limited to, e.g., pigmented spots, wrinkles and/or fine lines, acne, pores, sagging and/or loss of elasticity, uneven texture, skin thinning, dryness, oiliness, sensitivity, uneven skin tone, eczema, and/or dermatitis. In response, the multiple AI model-based solution can provide output that can be used for overcoming skin problems specific to the user. For example, such output can include generation or otherwise determination of a user-specific recommendation of a skin product with efficacy for therapeutically and/or dermatologically treating a predicted user-specific skin ailment and/or otherwise skin condition.

As an example, a user may have a specific skin concern. The user may describe or otherwise provide, through natural language, to the AI-based systems and methods, his or her specific concerns and other information (e.g., demographic and/or phenotype information) through a conversation. The AI-based systems and methods can then determine or capture natural language data from such conversation. In one example, the specific skin concern may involve acne. Acne generally occurs when pores become clogged with oil and dead skin cells. Acne may cause skin issues or conditions such as whiteheads, blackheads, or pimples. Such skin conditions may be treated products including ingredients such as tretinoin, adapalene, and benzoyl peroxide. Through a conversation, the user can describe these features to the AI-based systems and methods, where the AI-based systems and methods identify and recommend an acne skin care product.

As a still further example, the user may identify wrinkles, which can be caused by natural aging and/or environmental factors such as sun exposure, pollutants, smoking, etc. Wrinkles can refer to skin having a high amount of skin laxity. Wrinkles can be treated with products that include ingredients such as glycolic acid, retinol, vitamin C, and/or hyaluronic acid. Through a conversation, the user can describe these features to the AI-based systems and methods, where the AI-based systems and methods identify and recommend a wrinkle-related skin care product having the related active ingredients for treating wrinkles.

A still further example, pigmented spots (e.g., hemoglobin and/or melanin) may be identified by the user. Such spots may, in some cases, be effectively treated with a combination of hydroxycinnamic acids (HCAs) and niacinamide at a low pH can, which can decrease the melanin and hemoglobin in persistent spots or marks. Through a conversation, the user can describe these features to the AI-based systems and methods, where the AI-based systems and methods identify and recommend a pigment treating skin care product having the related active ingredients for treating skin pigments or spots (e.g., hemoglobin and/or melanin).

It is to be understood that additional, and/or different, skin concerns and/or related products having active ingredients for treating the skin concern may be identified and recommended, respectively.

Once a given skin concern is identified by the natural language data, then a synthetic image (e.g., a digital twin image) may be generated for the user, where the synthetic image includes the skin concern of the user. The AI-based systems and methods can then determine which product could treat the skin concern, where the based systems and methods can then generate a simulated images having graphical enhancements based on how the digital twin image, and specific skin concern depicted therein, is predicted to appear after applying the recommending product. The user would then be able to determine whether to purchase the product for real-world applications for treating his or her skin.

Additional details are provided by disclosure herein, which describes AI-based systems and methods for identification and/or classification of such skin conditions, issues, or concerns, which allows effective treatment, such as product and/or composition recommendation, selection, and use.

FIG. 1 illustrates an example artificial intelligence (AI)-based system 100 configured to provide personalized skin product recommendations, in accordance with various embodiments disclosed herein. In the example embodiment of FIG. 1, AI-based system 100 includes server(s) 102, which may comprise one or more computer servers. In various embodiments server(s) 102 comprise multiple servers, which may comprise multiple, redundant, or replicated servers as part of a server farm. In still further embodiments, server(s) 102 may be implemented as cloud-based servers, such as a cloud-based computing platform. For example, server(s) 102 may be any one or more cloud-based platform(s) such as MICROSOFT AZURE, AMAZON AWS, or the like. Server(s) 102 may include one or more processor(s) 104 (i.e., CPU(s) and GPU(s)) as well as one or more computer memories 106.

Memories 106 may include one or more forms of volatile and/or non-volatile, fixed and/or removable memory, such as read-only memory (ROM), electronic programmable read-only memory (EPROM), random access memory (RAM), erasable electronic programmable read-only memory (EE-PROM), and/or other hard drives, flash memory, MicroSD cards, and others. Memorie(s) 106 may store an operating system (OS) (e.g., Microsoft Windows, Linux, UNIX, etc.) capable of facilitating the functionalities, apps, methods, or other software as discussed herein. Memorie(s) 106 may also store AI models 108, which may comprise an artificial intelligence-based models, such as machine learning models, trained on natural language processing (NLP) data, images, and information regarding products for treating skin conditions or issues as described herein. The AI models 108 may comprise any of a natural language model, a synthetic image generation model, a product recommendation model, and/or an image simulation model as described herein.

Additionally, or alternatively, the AI models 108 may also be stored in database 105, which is accessible or otherwise communicatively coupled to server(s) 102. In addition, memories 106 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, an imaging-based machine learning model or component, such as any one or more of the AI models 108, where each may be configured to facilitate their various functionalities discussed herein. It should be appreciated that one or more other applications may be envisioned and that are executed by the processor(s) 104.

The processor(s) 104 may be connected to the memories 106 via a computer bus responsible for transmitting electronic data, data packets, or otherwise electronic signals to and from the processor(s) 104 and memories 106 in order to implement or perform the machine-readable instructions, methods, processes, elements or limitations, as illustrated, depicted, or described for the various flowcharts, illustrations, diagrams, figures, and/or other disclosure herein.

Processor(s) 104 may interface with memory 106 via the computer bus to execute an operating system (OS). Processor(s) 104 may also interface with the memory 106 via the computer bus to create, read, update, delete, or otherwise access or interact with the data stored in memories 106 and/or the database 104 (e.g., a relational database, such as Oracle, DB2, MySQL, or a NoSQL based database, such as MongoDB). The data stored in memories 106 and/or database 105 may include all or part of any of the data or information described herein, including, for example, NLP data, training images, and/or other images and/or information of the user, including phenotype data, demographic data, product recommendation data, or as otherwise described herein.

Server(s) 102 may further include a communication component configured to communicate (e.g., send and receive) data via one or more external/network port(s) to one or more networks or local terminals, such as computer network 120 and/or terminal 109 (for rendering or visualizing) described herein. In some embodiments, server(s) 102 may include a client-server platform technology such as ASP.NET, Java J2EE, Ruby on Rails, Node.js, a web service or online API, responsive for receiving and responding to electronic requests. The server(s) 102 may implement the client-server platform technology that may interact, via the computer bus, with the memories(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein.

In various embodiments, the server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some embodiments, computer network 120 may comprise a private network or local area network (LAN). Additionally, or alternatively, computer network 120 may comprise a public network such as the Internet.

Server(s) 102 may further include or implement an operator interface configured to present information to an administrator or operator and/or receive inputs from the administrator or operator. As shown in FIG. 1, an operator interface may provide a display screen (e.g., via terminal 109). Server(s) 102 may also provide I/O components (e.g., ports, capacitive or resistive touch sensitive input panels, keys, buttons, lights, LEDs), which may be directly accessible via, or attached to, server(s) 102 or may be indirectly accessible via or attached to terminal 109. According to some embodiments, an administrator or operator may access the server 102 via terminal 109 to review information, make changes, input training data or images, initiate training of AI models 108, and/or perform other functions.

As described herein, in some embodiments, server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 1, server(s) 102 are communicatively connected, via computer network 120 to the one or more user computing devices 111c1-111c3 and/or 112c1-112c3 via base stations 111b and 112b. In some embodiments, base stations 111b and 112b may comprise cellular base stations, such as cell towers, communicating to the one or more user computing devices 111c1-111c3 and 112c1-112c3 via wireless communications 121 based on any one or more of various mobile phone standards, including NMT, GSM, CDMA, UMMTS, LTE, 5G, or the like. Additionally, or alternatively, base stations 111b and 112b may comprise routers, wireless switches, or other such wireless connection points communicating to the one or more user computing devices 111c1-111c3 and 112c1-112c3 via wireless communications 122 based on any one or more of various wireless standards, including by non-limiting example, IEEE 802.11a/b/c/g (WIFI), the BLUETOOTH standard, or the like.

Any of the one or more user computing devices 111c1-111c3 and/or 112c1-112c3 may comprise mobile devices and/or client devices for accessing and/or communications with server(s) 102. In various embodiments, user computing devices 111c1-111c3 and/or 112c1-112c3 may comprise a mobile phone (e.g., a cellular phone), a tablet device, a personal data assistance (PDA), or the like, including, by non-limiting example, an APPLE iPhone or iPad device or a GOOGLE ANDROID based mobile phone or table. In various embodiments, the one or more user computing devices 111c1-111c3 and/or 112c1-112c3 may implement or execute an operating system (OS) or mobile platform such as Apple's iOS and/or Google's Android operation system.

Any of the one or more user computing devices 111c1-111c3 and/or 112c1-112c3 may comprise one or more processors and/or one or more memories for storing, implementing, or executing computing instructions or code, e.g., a mobile application or a home or personal assistant application, as described in various embodiments herein. As shown in FIG. 1, AI models 108a and/or an application 109a as described herein, or at least portions thereof, may also be stored locally on a memory of a user computing device (e.g., user computing device 111c1). In some aspects, AI models 108a as installed on a computing device may comprise the same AI models 108 as installed on server(s) 102. Additionally, or alternatively, AI models 108a may comprise a portion of AI models 108 as installed on server(s) 102. It is to be understood that in some aspects, any one or more of the AI models may be installed wholly at user computing device, wholly at server(s) 102, or partially on user computing device and partially on server(s) 102 where communication between AI models 108a and AI models 108 (e.g., via apps 109a and 109 respectively) occurs through computer network 120. Generally, when any AI model (e.g., any one of natural language model, synthetic image generation model, product recommendation model, and/or image simulation model) is referred to herein, it can belong to one or both AI models 108 and/or AI models 108a.

User computing devices 111c1-111c3 and/or 112c1-112c3 may comprise a wireless transceiver to receive and transmit wireless communications 121 and/or 122 to and from base stations 111b and/or 112b. In various embodiments, natural language data of users 202a, 202b, and/or 202c may be transmitted via computer network 120 to server(s) 102 for training of model(s) (e.g., AI models 108) and/or imaging analysis as described herein. Such natural language data may be received from an application implementing a GPT interface, for example, as described for FIG. 3 herein. The natural language data may be used for training or implementing model(s), such as AI or machine learning models (e.g., AI models 108), as described herein. Such natural language data may be transmitted to and/or stored on memorie(s) 106 and/or database 105 of server(s) 102.

Still further, each of the one or more user computer devices 111c1-111c3 and/or 112c1-112c3 may include a display screen for displaying graphics, images, text, classifications, natural language data, skin products, data, pixels, features, and/or other such visualizations or information as described herein. In various embodiments, graphics, images, text, classifications, natural language data, skin products, data, pixels, features, and/or other such visualizations or information may be received from server(s) 102 for display on the display screen of any one or more of user computer devices 111c1-111c3 and/or 112c1-112c3. Additionally, or alternatively, a user computer device, e.g., as described herein for FIG. 6, may comprise, implement, have access to, render, or otherwise expose, at least in part, an interface or a guided user interface (GUI) for displaying text and/or images on its display screen.

In some embodiments, computing instructions and/or applications executing at the server (e.g., server(s) 102) and/or at a mobile device (e.g., mobile device 111c1) may be communicatively connected for analyzing natural language data of user to output natural language data to the user describing user-specific product recommendation(s) and/or display, on a display screen, a user-specific simulated image, for example, as described herein. For example, one or more processors (e.g., processor(s) 104) of server(s) 102 may be communicatively coupled to a mobile device via a computer network (e.g., computer network 120). In such embodiments, an app may comprise a server app portion (e.g., app 109) configured to execute on the one or more processors of the server (e.g., server(s) 102) and a mobile app portion (e.g., app 109a) configured to execute on one or more processors of the mobile device (e.g., any of one or more user computing devices 11c1-111c3 and/or 112c1-112c3). In such embodiments, the server app portion is configured to communicate with the mobile app portion. The server app portion or the mobile app portion may each be configured to implement, or partially implement, one or more of: (1) receiving user-specific natural language data of a user, the natural language data defining user-specific phenotype information and user-specific demographic data of the user; (2) inputting the user-specific natural language data into the natural language model, wherein the natural language model generates one or more user-specific phenotype classifications and one or more user-specific demographic classifications defining the user; (3) inputting the one or more user-specific phenotype classifications and the one or more user-specific demographic classifications into the synthetic image generation model, wherein the synthetic image generation model generates a user-specific digital twin image of the user; (4) inputting the user-specific digital twin image of the user, the one or more phenotype classifications of the user, and the one or more demographic classifications of the user into the product recommendation model, wherein the product recommendation model generates a user-specific product recommendation for the user, the user-specific product recommendation designed to address at least one issue identified in the user-specific digital twin image or the one or more user-specific phenotype classifications; (5) inputting the user-specific digital twin image, the user-specific product recommendation, the one or more phenotype classifications of the user, and the one or more demographic classifications of the user into the image simulation model, wherein the image simulation model generates a user-specific simulated image based the user-specific digital twin image and the user-specific product recommendation, the user-specific simulated image graphically depicting the user-specific digital twin image graphically enhanced based on the user-specific product recommendation; (6) outputting natural language data to the user describing the user-specific product recommendation; and/or (7) displaying, by the app on a display screen, the user-specific simulated image.

FIG. 2A illustrates an example artificial intelligence (AI)-based method 250 for providing personalized skin product recommendations, in accordance with various embodiments disclosed herein. FIG. 2A illustrates implementation or execution of a multiple AI model training phase 251 of AI-based method 250. The multiple AI model training phase 251 comprises training multiple models, e.g., a natural language model, a synthetic image generation model, a product recommendation model, and an image simulation model. The models are trained on data (e.g., natural language data) as well as output, where, at least for some models, the output of one model is used as input for training or implementation of another model. In this way, the multiple AI models (e.g., AI models 108 and/or AI models 108a) may comprise an ensemble model or downstream models, where some of the models receive input from other models to produce new or additional output. In various aspects, each of the AI models (e.g., AI models 108 and/or AI models 108a), including the natural language model, the synthetic image generation model, the product recommendation model, and the image simulation model, may be stored in one or more memories (e.g., memorie(s) 106, database 105, and/or memories of a user computing device). In addition, the AI models are accessible by an application (app) (e.g., app 109 and/or app 109a) comprising computing instructions stored in the one or more memories. The AI models may be accessed and/or trained by one or more processors, including processor(s) of a user computing device (e.g., user computing device 111c1) and/or server(s) 102.

At block 252, AI-based method 250 comprises training, by one or more processors, a natural language model with natural language data (e.g., text data, voice data, image data, and/or video data) and demographic data (e.g., ethnicity, etc.) of respective users. In various aspects the natural language model comprises a large language model (LLM). In some implementations, the natural language model is trained based on an existing or general natural language model (LLM), such as a GPT model of OPENAI (e.g., the GPT-4 model), or other LLM model such as the Llama2 model. In such implementations, the existing or general LLM is further trained on trained on natural language data (e.g., audio, text, and/or images/video data) related to skin care related information, including various skin issues and/or skin conditions, including, by way of non-limiting example, those as described herein.

The natural language model is trained or otherwise configured to output one or more phenotype classifications corresponding to one or more phenotypes of the respective users. The natural language model may further be trained or otherwise configured to output one or more demographic classifications corresponding to one or more demographic attributes of the respective users. For example, in some implementations, phenotype classification(s) and/or demographic classification(s) may comprise one or more of: (a) a gender type classification; (b) an age type classification; (c) an ethnicity type classification; or (d) a skin concern type classification. For example, the phenotype classifications may comprise or be associated with any one or more skin concerns or issues of a user, which may be, by way of non-limiting example, skin health, skin appearance, skin dryness, skin shine, skin radiance. In some aspects, phenotype classifications may comprise ordinal values ordered based on a degree of skin health, skin appearance, skin dryness, skin shine, and/or skin radiance, or the like. Additionally, or alternatively, the phenotype classifications may be numbered values (e.g., values 1-10) ranked based on a degree of skin health, skin appearance, skin dryness, skin shine, and/or skin radiance, or the like.

Additionally, as described above, natural language model further configured to output one or more demographic classifications corresponding to one or more demographic attributes of the respective users. Demographic attributes of a user may comprise, by way of non-limiting example, any one or more of gender, age, ethnicity, geographic area, health, and/or and other user information. For example, a user may provide natural language data indicating that the user is age 35, the user is of Asian descent, and that the user lives in a certain geographic region (e.g., a city in China).

At block 254, AI-based method 250 comprises training, by the one or more processors, a synthetic image generation model on a plurality of images of respective individuals or users corresponding to the one or more phenotype classifications and the one or more demographic classifications as outputted by the natural language model. For example, in some aspect the images may be tagged or labeled, for example, with meta data, defining phenotype and/or demographic information of the respective individuals. In various aspects, the meta data may be at the pixel level, for example, defining or identifying locations of skin issues or conditions (e.g., hemoglobin and/or melanin) identified in a given image depicting a user's skin.

The synthetic image generation model may be trained or otherwise configured with image, pixel data, meta, and/or label data to output digital twin images of respective individuals or users (e.g., synthetic individuals) based on the plurality of images corresponding to the one or more phenotype classifications and the one or more demographic classifications of the respective users as input. For example, in various implementations, the synthetic image generation model comprises an AI model configured to generate photorealistic images, for example, where the digital twin images comprise photorealistic images. The user-specific digital twin image may comprise a photorealistic image of a digital twin similar to the user. In some example implementations, the digital twin images may depict photorealistic images of individuals that do not actually exist, but that appear to be real. In addition, the digital twin images may be generated to have skin issues or conditions (e.g., pigmented spots, wrinkles and/or fine lines, acne, pores, sagging and/or loss of elasticity, uneven texture, skin thinning, dryness, oiliness, sensitivity, uneven skin tone, eczema, dermatitis) upon which the synthetic image generation model was trained.

The synthetic image generation model may comprise a pre-trained deep learning model, machine learning model, generative adversarial network, conditional generative adversarial network, convolution neural network, and/or vision transformer. This synthetic image generation model may be pre-trained using a large number of facial images covering real-life imaging conditions (e.g., consumer imaging showing skin conditions or issues) as well as laboratory imaging conditions (e.g., clinical imaging showing skin conditions or issues). The synthetic image generation model is configured to produce photo realistic facial images based on the natural language data obtained from the user by interacting with the natural language model.

Still further, in some implementations, AI models 108 and/or AI models 108*a* further comprise an imaging model trained on one or more respective images of the respective users and is trained or otherwise configured to output the one or more phenotype classifications corresponding to one or more phenotypes of the respective users. The image model may comprise a vision transformer and/or convolution neural network (CNN) configured to determine phenotype classifications from the image. In such implementations, the output of the natural language model and an output of the imaging model can be combined (e.g., averaged or weighted based on classifications as output by each model) to determine the one or more phenotypes of the respective users. In some implementations, the phenotype related information may be obtained based on imaging analysis of the imaging model alone, and without the need for natural language data from the user.

At block 256, AI-based method 250 comprises training, by the one or more processors, a product recommendation model on the digital twin images of the respective users as output by the synthetic image generation model. The product recommendation model may further be trained on the one or more phenotype classifications and the one or more demographic classifications. The product recommendation model is trained or otherwise configured to output product recommendations for the respective users based on the digital twin images, the one or more phenotype classifications, and the one or more demographic classifications as input. In various implementations, the product recommendation model may comprise a model trained to determine efficacy of one or more skin products corresponding to the one or more phenotypes of the respective users. The efficacy of a given product can be based on active ingredients of a given skin care product, and data regarding the efficacy of a given product, and its effects of skin condition or issue may be used to train the product recommendation model. The product recommendation can be for a skin care product specific to the user, and each of the skin care products may be mapped or otherwise correlated to treating a known skin care condition or issue (e.g., pigmented spots, wrinkles and/or fine lines, acne, pores, sagging, and/or loss of elasticity, uneven texture, skin thinning, dryness, oiliness, sensitivity, uneven skin tone, eczema, dermatitis). For example, in some implementations, the synthetic image generation model may comprise a look up table, statistical model, machine learning model, deep learning model, recommendation engine developed or trained based on the consumer information (e.g., demography, skin concerns, skin goals) and clinical research carried out to evaluate the efficacy of the one or more skin care products.

At block 258, AI-based method 250 comprises training, by the one or more processors, an image simulation model on the digital twin images as output by the synthetic image generation model and further trained on the product recommendations as output by the product recommendation model. The image simulation model may further be trained on the product recommendation model may be further trained on the one or more phenotype classifications and the one or more demographic classifications. The image simulation model is trained or otherwise configured to generate simulated images based the digital twin images with one or more graphical enhancements based on the product recommendations. In various implementations, the graphical enhancements may comprise skin annotations or otherwise graphical enhancements depicted by the skin of the digital twin image and/or otherwise its pixel data. The image simulation model may comprise an AI model trained to determine effects of one or more product attributes (e.g., active ingredients, pigmentation, etc.) corresponding to respective products of the product recommendations. For example, image simulation model may comprise a machine learning model, deep learning model, generative adversarial network, conditional generative adversarial network, convolution neural network, vision transformer, and/or a statistical model. The image simulation model can be pre-trained based on clinical research carried out to evaluate the efficacy of one or more skin care products on respective individual's skin for generating simulated images based the digital twin images with one or more graphical enhancements based on the product recommendations.

More generally, in various aspects, each of the AI models (e.g., AI models 108 and/or AI models 108*a*) comprises an artificial intelligence (AI) based model trained with at least one AI algorithm. Training of the AI models involves analysis of the natural language data, phenotype data, demographic data, images, or other training data as described herein configure weights of the respective AI model. For example, in various embodiments herein, generation of the AI models 108 involves training the AI models with natural language data, a plurality of training images of individuals, and/or data or classifications as described herein where each of the data comprises tokens, words, and/or pixel data of images defining various features, such as demographic, phenotype, image features, or other features as described herein. In some embodiments, one or more processors of a server or a cloud-based computing platform (e.g., server(s) 102) may receive the training data (e.g., natural language data, demographic data, phenotype data, training images, or other data as described herein) via a computer network (e.g., computer network 120). In such embodiments, the server and/or the cloud-based computing platform may train one or more of the AI models with such training data. For example, at least some of the AI models may be trained with user demographic data (e.g., data indicating race, skin color, etc.) and environment data (e.g., amount of sunshine, geography, weather conditions, etc.) of the respective users. In such aspects, spot classification(s) or identifiers may be generated by an AI model to provide a degree of a skin issue or condition.

In some implementations, image modeling may include training a machine learning based model (e.g., a synthetic image generation model and/or an image simulation model) on pixel data of images depicting skin or skin regions of respective individuals and/or digital twin images. For example, in various implementations, one or more features of skin or skin regions may differ based on one or more user demographics and/or ethnicities of the respective individuals and/or digital twins represented in the respective training images, e.g., as typically associated with, or otherwise naturally occurring for, different races, genomes, and/or geographic locations associated with such demographics and/or ethnicities. Synthetic image generation model and/or image simulation model may generate output (e.g., digital twin images and/or user-specific digital twin image graphically enhanced images) based on the ethnicity and/or demographic value of the respective individual. Additionally, or alternatively, image modeling may include using a machine learning imaging model, as previously trained, to determine, based on the pixel data (e.g., including their L*, a*, and b* values and/or RGB values) one or more images of the individual(s), an image classification of the user's skin or skin region. For example, the weights of the model may be trained via analysis of various L*a*b* values of individual pixels of a given image. For example, dark or low L* values (e.g., a pixel with an L* value less than 50) may indicate regions of an image where hemoglobin and/or melanin is present. Likewise, a slightly lighter L* values (e.g., a pixel with an L* value greater than 50) may indicate the absence of melanin or hemoglobin. Still further, high/low a* values may indicate areas of the skin containing more/less melanin and/or hemoglobin. Together, when a pixel having skin toned L*a*b* values is positioned within a given image, or is otherwise surrounded by, a group or set of pixels having melanin and/or hemoglobin toned colors, then an image based model (e.g., synthetic image generation model and/or image simulation model) can determine or generate output (e.g., digital twin images and/or user-specific digital twin image graphically enhanced images) as identified within the given image. In this way, pixel data (e.g., detailing skin regions of skin of respective individuals or digital twins) of 10,000s training images may be used to train or use a machine learning imaging model to determine outputs, e.g., as described herein, related to such outputs.

In various embodiments, a machine learning imaging model, as described herein (e.g. any one of AI models 108), may be trained using a supervised or unsupervised machine learning program or algorithm. The machine learning program or algorithm may employ a neural network, which may be a convolutional neural network, a vision transformer, a deep learning neural network, or a combined learning module or program that learns in two or more features or feature datasets (e.g., natural language data and/or pixel data) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some embodiments, the artificial intelligence and/or machine learning based algorithms may be included as a library or package executed on server(s) 102. For example, libraries may include the TENSORFLOW based library, the PYTORCH library, and/or the SCIKIT-LEARN Python library.

Machine learning may involve identifying and recognizing patterns in existing data (such as identifying features of skin, such as spot and/or color or discoloration related features, in the pixel data of image and/or based on natural language data as described herein) in order to facilitate making predictions or identification for subsequent data (such as using the model on new pixel data and/or natural language data in order to determine or generate digital twin images, user-specific product recommendations, and/or simulated images based the digital twin images with one or more graphical enhancements based on the product recommendations).

Machine learning model(s), such as the AI models described herein, may be created and trained based upon example data (e.g., "training data" such as natural language data and/or pixel data) inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

Figure 2B:
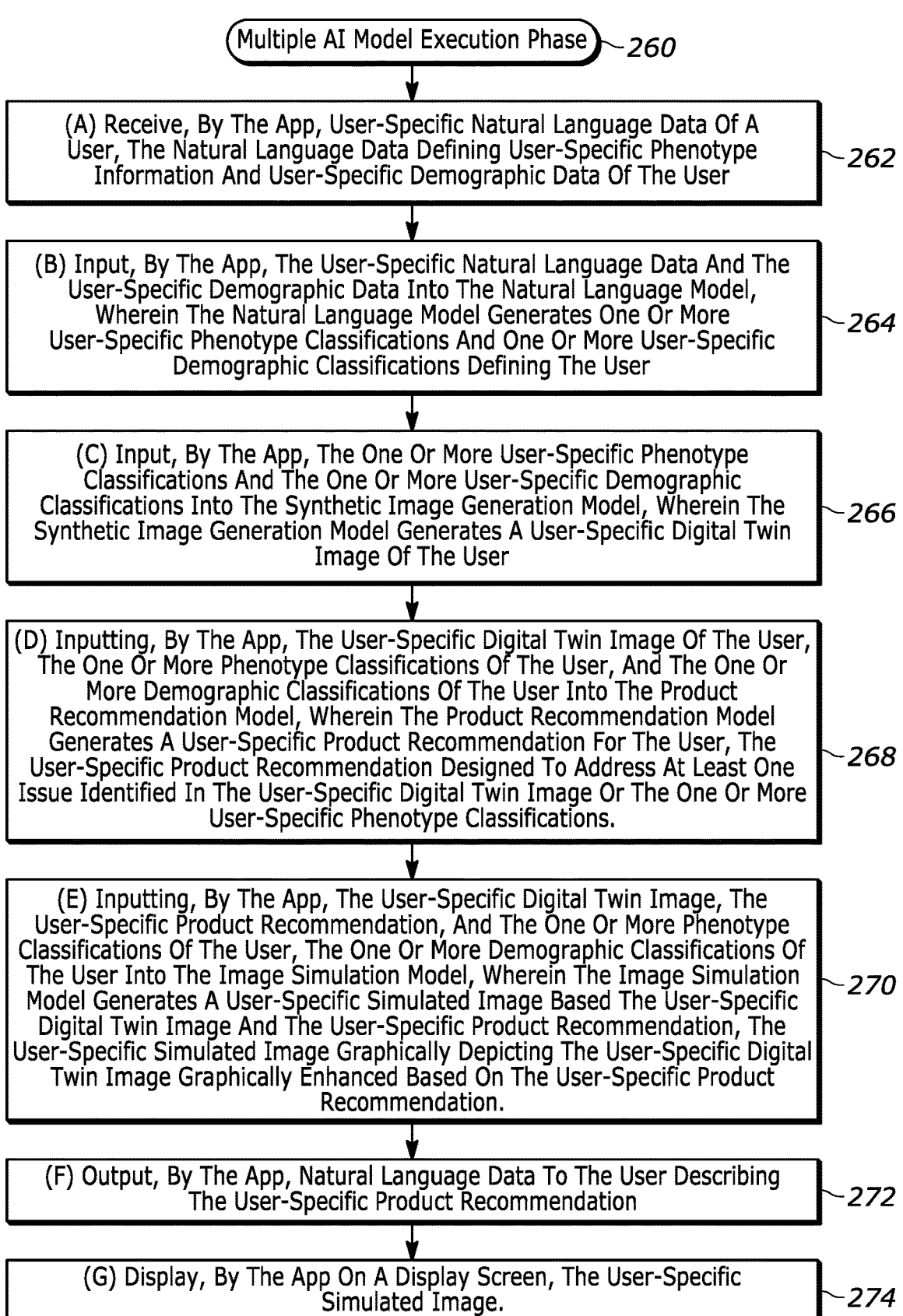
FIG. 2B further illustrates the example artificial intelligence (AI)-based method of FIG. 2A, in accordance with various embodiments disclosed herein.

FIG. 2B further illustrates the example artificial intelligence (AI)-based method 250 of FIG. 2A, in accordance with various embodiments disclosed herein. FIG. 2B illustrates implementation or execution of a multiple AI model execution phase 260 of AI-based method 250. The multiple AI model execution phase 260 comprises accessing and executing multiple models, e.g., including the models (e.g., AI models 108 and 108*a*) as trained during the AI model training phase 251 in order to provide inputs and outputs to be used by the models for generating a user-specific product recommendation and a user-specific simulated image based a user-specific digital twin image and a user-specific product recommendation. The multiple AI model execution phase 260 may be implemented by an app (e.g., app 109 and/or 109*a*) executing on one or more processors.

At block 262, AI-based method 250 comprises receiving, by the app, user-specific natural language data of a user (e.g., user 202*a*). The natural language data may be received, for example, from LLM interface 300 as described herein for FIG. 3. The natural language data may define user-specific phenotype information and user-specific demographic data of the user, including, by way of non-limiting example, any one or more of gender, age, ethnicity, and/or skin concerns identifying skin issues or conditions of the user. The natural language model may comprise or may be part of a conversation engine, e.g., as part of an application (e.g., app 109 and/or app 109*a*), where the app accessed the natural language model to obtain natural language data by directly asking a question and/or deriving from the user information such as age, gender, ethnicity, and skin concerns. For example, user 202*a* may be a 41-year-old female having a skin concern related to hemoglobin.

At block 264, AI-based method 250 comprises inputting, by the app (e.g., app 109 and/or 109*a*), the user-specific natural language data into the natural language model. The natural language model may then generate, based on the natural language data, one or more user-specific phenotype classifications (e.g., skin health, skin appearance, skin dryness, skin shine, skin radiance) and one or more user-specific demographic classifications (e.g., gender, age, ethnicity, geographic area, health, and/or and other user information) defining the user.

At block 266, AI-based method 250 comprises inputting, by the app (e.g., app 109 and/or 109*a*), the one or more user-specific phenotype classifications and the one or more user-specific demographic classifications into the synthetic image generation model. The synthetic image generation model may then generate a user-specific digital twin image of the user based on the user's phenotype classification(s) and/or demographic classification(s). For example, the digital twin image may be an image that is intended to look like or resemble the user base on the phenotype classification(s) and/or demographic classification(s), including age, ethnicity, skin condition, etc. However, the digital twin image may not appear the same as the user, e.g., not the same as a digital photograph taken of the image. In this way, the digital twin image acts as a surrogate or syntenic image of the user without the need for the user to transfer an actual image across a computer network, e.g., computer network 120.

In some implementations, the user-specific digital twin image may be provided to the user. An app (e.g., app 109 and/or 109*a*) may receive additional user-specific natural language data from the user for manipulating the user-specific digital twin image. For example, the user many desire to change certain aspects of features of the digital twin image to make the digital twin image look more like the user. The app (e.g., app 109 and/or 109*a*), accessing the synthetic image generation model, may then update the user-specific digital twin image based on the additional user-specific natural language data. In this way, the user can alter the appearance and/or look of his or her digital twin image (e.g., skin type, skin concern, color, etc.) based on additional text, voice, video, or otherwise natural language data and instructions.

At block 268, AI-based method 250 comprises inputting, by the app (e.g., app 109 and/or 109*a*), the user-specific digital twin image of the user, the one or more phenotype classifications of the user, and the one or more demographic classifications of the user into the product recommendation model. The product recommendation model then generates a user-specific product recommendation for the user. The user-specific product recommendation may include a product recommendation for a manufactured product (e.g., a skin creme or lotion having ingredients for treating a specific skin condition or issue). The user-specific product recommendation may be designed to address at least one issue identified in the user-specific digital twin image or the one or more user-specific phenotype classifications. The identified issue may comprise a skin issue or condition (e.g., increased melanin, hemoglobin, and/or acne) as depicted in the pixel data of the user-specific digital twin image and/or as determined based on the one or more user-specific phenotype classifications as determined from the user's natural language data.

At block 270, AI-based method 250 comprises inputting, by the app (e.g., app 109 and/or 109*a*), the user-specific digital twin image, the user-specific product recommendation, the one or more phenotype classifications of the user, and the one or more demographic classifications of the user into the image simulation model. The image simulation model may then generate an enhanced image, e.g., a user-specific simulated image based the user-specific digital twin image and the user-specific product recommendation. The user-specific simulated image is generated or output to graphically depicting the user-specific digital twin image graphically enhanced based on the user-specific product recommendation. The graphical enhancement to the user-specific simulated image may comprise an update or change to the pixels of the first digital twin image of the user, where the user-specific simulated image newly depicts a reduced or eliminated degree or appearance of the skin issue or condition as predicted would occur had the product, as recommended, been applied to the user's skin.

At block 272, AI-based method 250 comprises outputting, by the app (e.g., app 109 and/or 109*a*), natural language data to the user describing the user-specific product recommendation. For example, the natural language data may include output from LLM interface 300, where the conversation engine of the natural language model converses with the user regarding the user-specific product recommendation, product usage, general advice regarding cause(s) of the user-specific skin condition or issue, and/or how to avoid the skin condition and/or issue in the future.

At block 274, AI-based method 250 comprises displaying, by the app (e.g., app 109 and/or 109*a*) on a display screen, the user-specific simulated image. The display screen may be a display screen of a user computer device (e.g., user computing device 111*c*1). In some aspects, the user-specific simulated image may be rendered on the display screen in real-time or near-real time, during, or after receiving, the natural language data of a user.

Still further, in some implementations, a user-specific product recommendation may be displayed on the display screen (e.g., display screen of a user computing device) with instructions for treating, with the manufactured product, at least one feature identifiable in pixel data comprising a skin region of the user. The pixel data may be pixel data of the user-specific simulated image. For example, the instructions may provide the user with information (e.g., avoid direct sun exposure) in order reduce or eliminate hyper melanin production at the skin region identifiable within the image.

In additional implementations, a user-specific product recommendation comprises a product recommendation for a manufactured product. The manufactured product may comprise a pharmaceutical, therapeutic, or other product for treating the at least one spot feature identifiable in the pixel data. For example, the product may comprise a composition, such as a cream, with hydroxycinnamic acids (HCAs) and niacinamide at a low pH can decrease the melanin and hemoglobin in persistent spots or marks. For example, a product may be than be recommended to treat the identified spot type(s), where, for example, for a hemoglobin type spot, an anti-inflammation product may be recommended. For a melanin type spot, a product for treating hyperpigmentation may be recommended. In some implementations, the app, based on the user-specific product recommendation, the manufactured product for shipment to the user.

With regard to manufactured product recommendations, in some implementations, one or more processors (e.g., server(s) 102 and/or a user computing device, such as user computing device 111c1) may generate a modified image (e.g., a simulated or enhanced image) based on the at least one image of the user, e.g., as originally received. In such embodiments, the modified image may depict a rendering of how the user's skin or skin regions are predicted to appear after treating the at least one feature with the manufactured product. For example, the modified image may be modified by updating, smoothing, or changing colors of the pixels of the image to represent a possible or predicted change after treatment of the at least one feature within the pixel data with the manufactured product. The modified image may then be rendered on the display screen of the user computing device (e.g., user computing device 111c1).

FIG. 3 illustrates an example user interface showing a large language model (LLM) interface 300 for capturing natural language data of a user, in accordance with various embodiments disclosed herein. In various aspects, LLM interface 300 may be implemented, invoked, or executed by an application, such as app 109a executing on a user computing device (e.g., user computing device 111c1) and/or app 109 executing on server 102. For example, in some implementations LLM interface 300 may comprise a graphical user interface (GUI) rendered by app 109a, which may comprise a web browser-based application (e.g., implemented on a web browser such as GOOGLE CHROME). Additionally, or alternatively, LLM interface 300, e.g., as rendered on a user computing device (e.g., user computing device 111c1) may communicate, e.g., over computer network 120, with server 102. Such communication allows app 109a to communicate with and receive and transmit data to and/or from, app 109 on server 102, and to access data and/or AI models 108, which may be stored on memorie(s) 105 and/or database 105. In an example, LLM interface 300 communicates with a language-based AI model (e.g., a natural language model) stored on server 102. The language-based AI model may comprise an instance of a large language model such as Llama2 or GPT-4.

With reference to FIG. 3, LLM interface 300 comprises a text-based interface, e.g., a conversation engine, in which a user (e.g., user 202a) can interact with the artificial intelligence (AI)-based system 100 of FIG. 1. LLM interface 300 can also be configured to provide personalized skin product recommendations. While FIG. 3 illustrates an example capturing natural language data (e.g., text-based data) via the example text-based interface of LLM interface 300, it should be understood that other natural language data, including, by way of non-limiting example, voice data, and/or video data may also be captured and received by LLM interface 300.

As shown in the example of FIG. 3, a user interacts with LLM interface 300 by providing natural language text-based data indicating a skin type and indicating a skin condition or issue. The user further asks a natural language question regarding ingredients of a product used to treat the skin condition or issue. The user's natural language data can be received by an application (e.g., app 109a and/or app 109) and then provided or transferred to a GPT AI model (e.g., a GPT-4 AI model instance stored on server(s) 102). The GPT AI model can respond with output providing relevant information, and also seek new natural language data from the user in order to gain a complete set of data for providing to a natural language model, as described herein. The natural language model may use such natural language data to determine or output user-specific phenotype information and user-specific demographic data of the user, such as gender, age, ethnicity, and/or skin concerns or issues of the user.

Figure 4A:
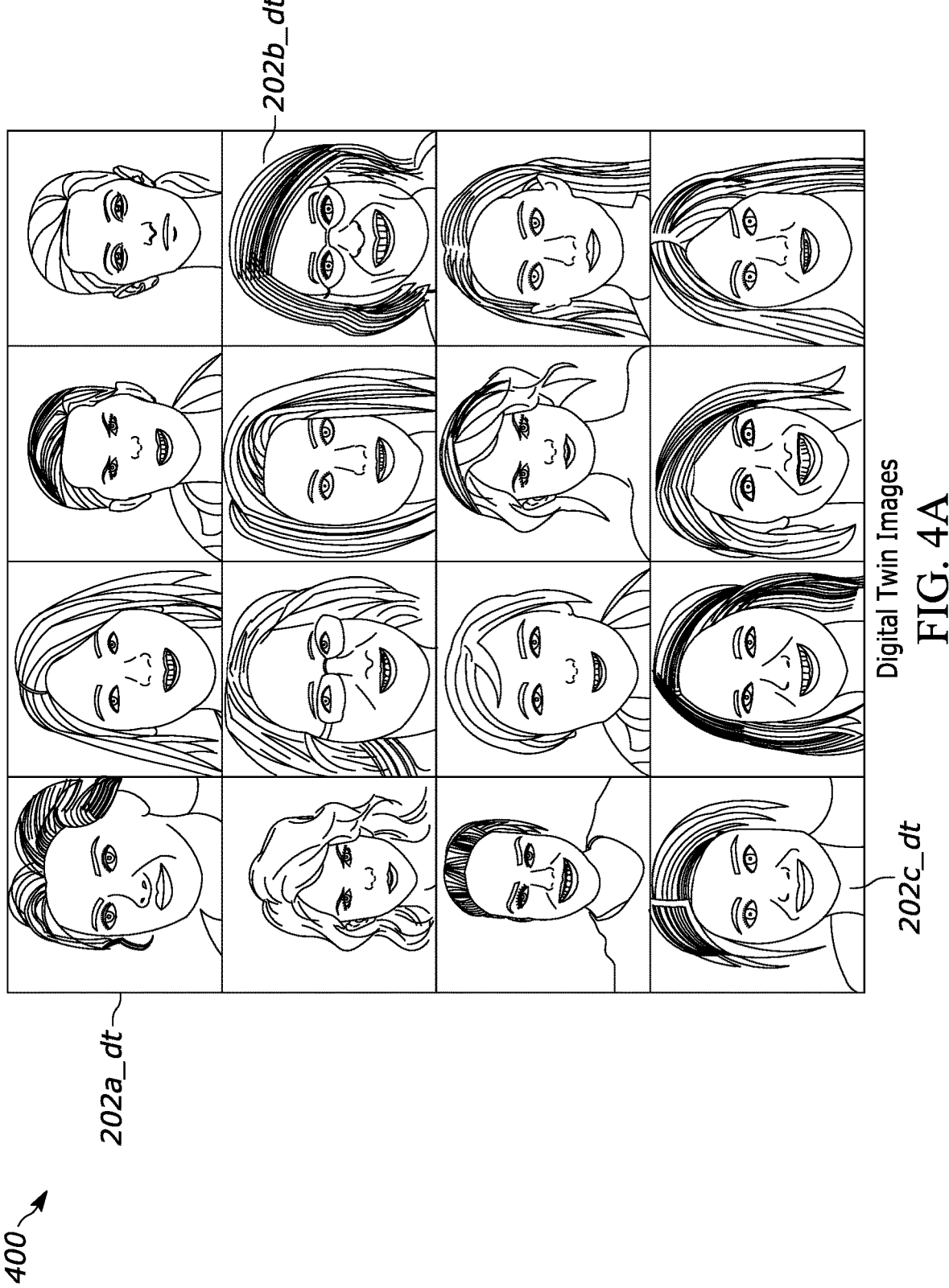
FIG. 4A illustrates an example set of digital twin images that may be used for training and/or implementing an artificial intelligence (AI) model, in accordance with various embodiments disclosed herein.

FIG. 4A illustrates an example set of digital twin images that may be used for training and/or otherwise implementing an artificial intelligence (AI) model, such as the synthetic image generation model and/or image simulation model, in accordance with various embodiments disclosed herein. Digital twin image 202a_dt1 (as well as the digital twin images depicted for FIG. 4A, including, by way of non-limiting example 202b_dt1 and 202c_dt1) may be generated based on user-specific phenotype classifications and user-specific demographic classifications as received from or determined for respective users (e.g., users 202a, 202b, and 202c) by the natural language model as described herein. For example, synthetic image generation model may input user-specific phenotype classification(s) and user-specific demographic classification(s) for a specific user to output a given digital twin image for the user. The user-specific phenotype classification(s) and user-specific demographic classification(s) for a specific user may have previously been determined by the natural language model inputting the user's natural language data and the user's specific demographic data. Each of the digital twin images may comprise photo-realistic images comprising pixel data, for example, as would have been captured by a digital camera. In various aspects, synthetic image generation model is trained on a plurality of images of real-world individuals. Each of the real-world individuals of the images would have been correlated or mapped (e.g., via supervised learning) to one or more phenotype classifications and one or more demographic classifications, including those, for example as outputted by the natural language model. In this way, the synthetic image generation model is to output digital twin images (e.g., those of FIG. 4A) of respective users. For example, one individual may have brown skin, be of a certain age (e.g., 35 years old), and have a skin condition and/or skin concern type classification (e.g., pigmented spots, wrinkles and/or fine lines, acne, pores, sagging and/or loss of elasticity, uneven texture, skin thinning, dryness, oiliness, sensitivity, uneven skin tone, eczema, dermatitis). Another individual may have white skin, be of a different age (e.g., 24 years old), and have a different skin condition and/or skin concern type classification (e.g., acne). In this way, the digital twin images (e.g., those of FIG. 4A) are based on a plurality of images of the training images of real-world individuals that have been mapped to the one or more phenotype classifications and the one or more demographic classifications of the respective users.

It is to be understood that the digital twin images shown for FIG. 4A are non-limiting examples of example digital twin images, and that additional and/or different digital twin images may also be output by the synthetic image generation model. In some implementations, a digital twin image (e.g., any of the digital twin images digital twin image 202_*dt*1, 202*b_dt*1, and 202*c_dt*1) may be unique for each users such that no one user shares a same digital twin image with another user.

Figures 4B, 4C:
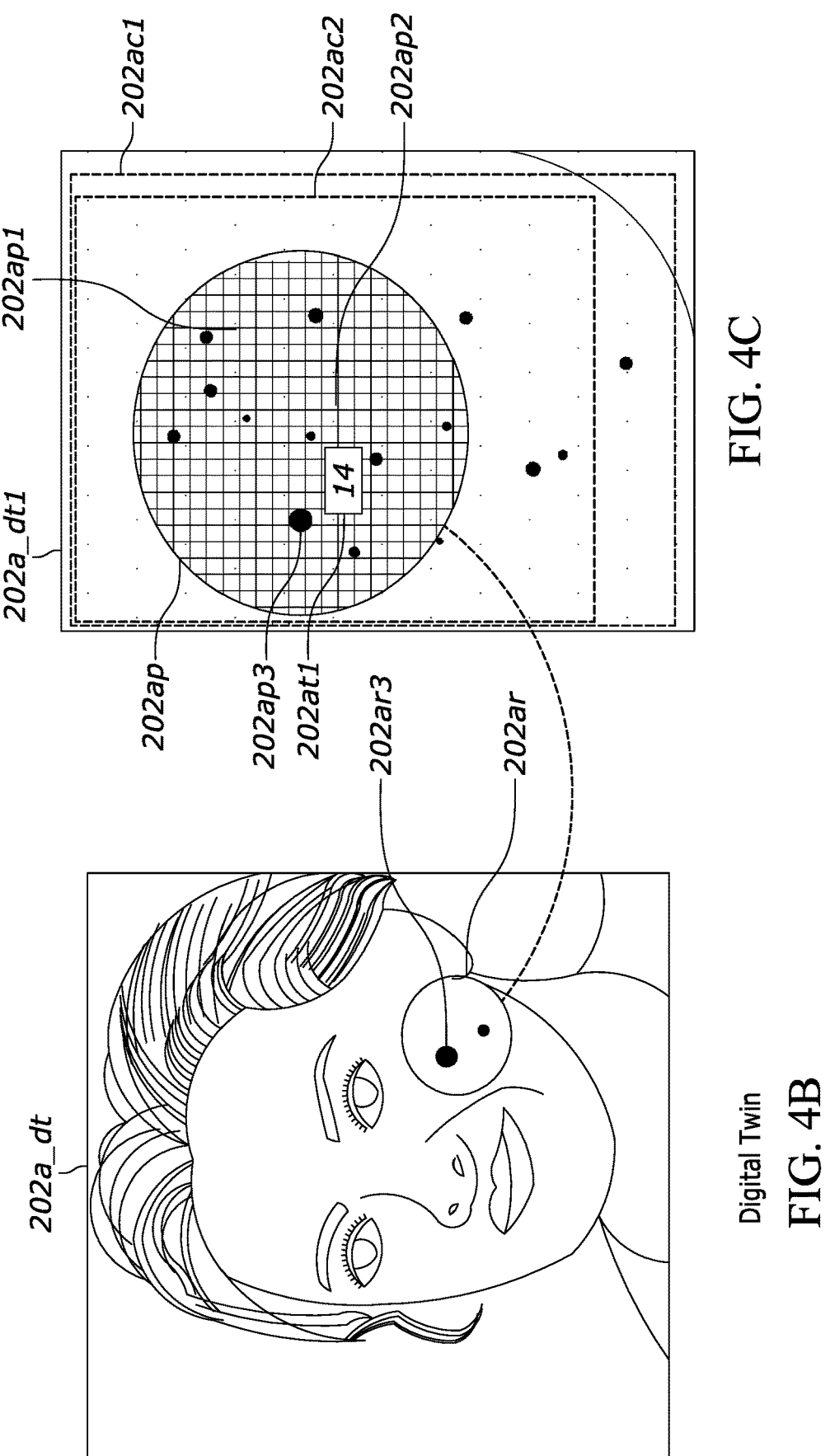
FIG. 4B illustrates an example digital twin image as selected or generated for a given user, in accordance with various embodiments disclosed herein.
FIG. 4C illustrates an example image and its related pixel data that may be used for training and/or implementing an artificial intelligence (AI) model, in accordance with various embodiments disclosed herein.

FIG. 4B illustrates an example digital twin image 202*a_dt* as selected or generated for a given user, in accordance with various embodiments disclosed herein. Digital twin image 202*a_dt* represents a digital twin or otherwise synthetic image of user 202*a* of FIG. 1. In at least one implementation, digital twin image 202*a_dt* is generated upon receipt, e.g., by app 109 and/or 109*a*, of user 202*a*'s natural language data, which defines user-specific phenotype information (e.g., gender is female, age is 41, etc.) and user-specific demographic data (e.g., the user is of Caucasian decent) of user 202*a*. The user-specific natural language data of user 202*a* may be input into the natural language model, which generates one or more user-specific phenotype classifications (e.g., a gender type classification, an age type classification, an ethnicity type classification, or a skin concern type classification), and/or one or more user-specific demographic classifications (e.g., Caucasian) defining the user.

For example, in the example of FIG. 4B digital twin image 202*a_dt* depicts a digital twin image of user 202*a* as a female of Caucasian decent and age 41. Digital twin image 202*a_dt* is generated based on the user 202*a*'s information provided via LLM interface 300 as illustrated for FIG. 3. Digital twin images may be generated or updated with skin conditions or issues, where such skin conditions or issues are also based on the user's natural language data, e.g., information provided via LLM interface 300. For example, as shown in the example of FIG. 4B, user 202*a* provided natural language data describing or defining a skin condition or issue associated with increased melanin, e.g., a melanin related spot 202*ar*3. User 202*a* may have also provided natural language data describing a location of a melanin related spot, e.g., in a skin area 202*ar* of user's left cheek. Synthetic image generation model may use such natural language data as input to generate a user-specific digital twin image (e.g., digital twin image 202*a_dt*) having the same or similar skin condition or issue (e.g., melanin related spot(s), such as melanin related spot 202*ar*3) in the same or similar skin area (e.g., skin area 202*ar*).

FIG. 4C illustrates an example image 202_*dt*1 and its related pixel data that may be used for training and/or implementing an artificial intelligence (AI) model, in accordance with various embodiments disclosed herein. In the example of FIG. 4C, image 202_*dt*1 represents and is depicted as a zoomed or cropped version of digital twin image 202*a_dt*. In various aspects, image 202_*dt*1 represents an image used to train the synthetic image generation model such that the synthetic image generation model is configured to generate otherwise output a user-specific digital twin image (e.g., digital twin image 202_*dt*) of a user, where user-specific digital twin image includes at least one issue (e.g., a skin issue such as acne, a hemoglobin related spot, and/or a melanin related spot) as identified in the image. A specific issue (e.g., a specific skin issue) as identified for the user may then be applied (e.g., superimposed or overlayed) onto the digital twin image (e.g., digital twin image 202_*dt*) to generate an image depicting a skin issue in the user-specific digital twin image. In this way, training synthetic image generation model can be trained to associate or correlate NPL data of the user describing a skin issue (e.g., where the user describes a melanin related spot 202*ar*3) to pixel related data of an image (e.g., image 202_*dt*1) that depicts that skin issue.

Figures 5A, 5B:
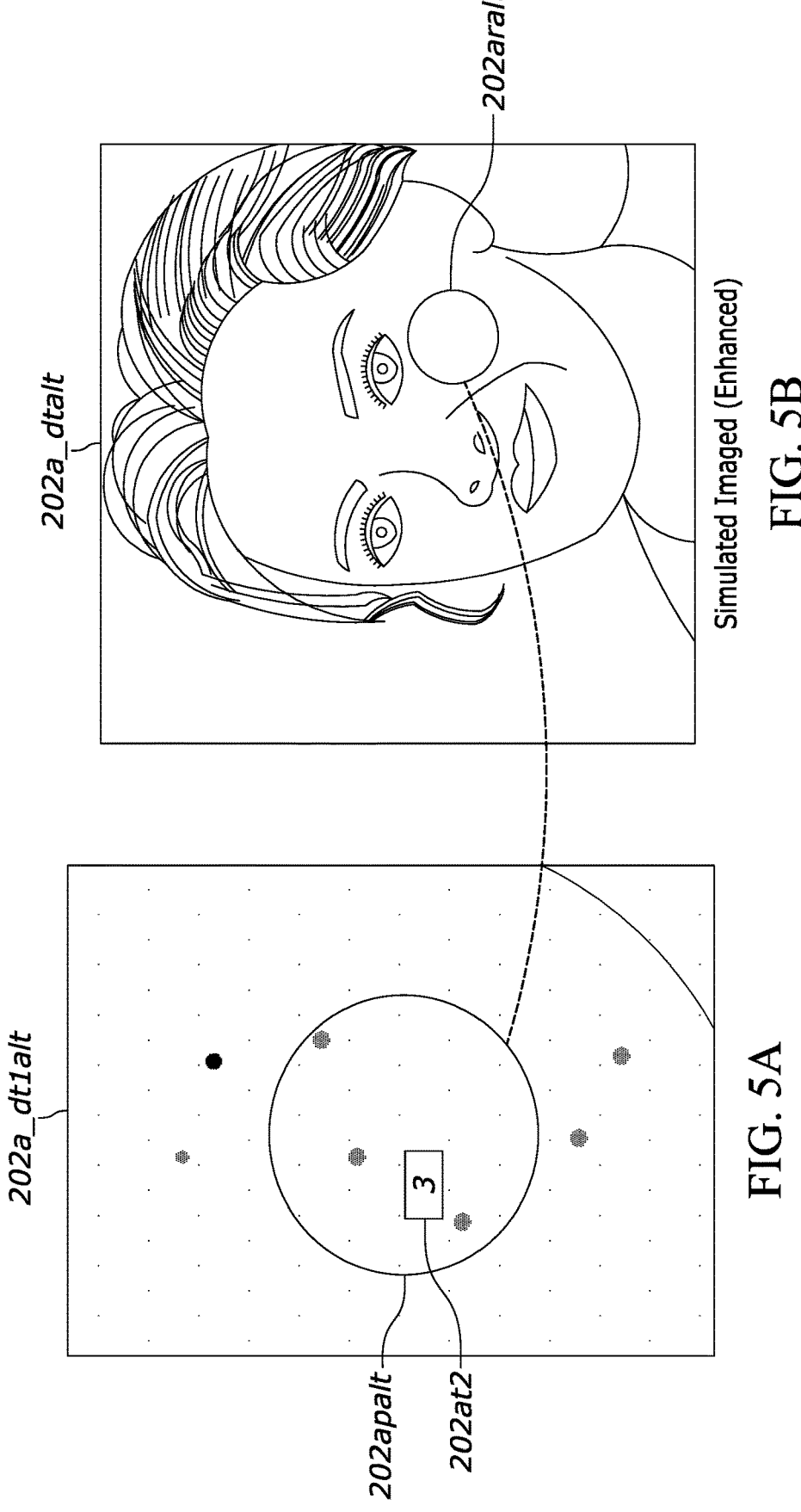
FIG. 5A illustrates an example image as enhanced by an image simulation model, in accordance with various embodiments disclosed herein.
FIG. 5B illustrates a further example image as enhanced by an image simulation model, in accordance with various embodiments disclosed herein.

Still further, digital images, such as example image 202_*dt*1 as well as image 202_*dt*1*alt* as described for FIG. 5A, may be generated and stored at server(s) 102 and may be analyzed by, and/or used to train, the synthetic image generation model and/or the image simulation model, which may each be machine learning models as described herein). The synthetic image generation model may be trained on images such as image 202_*dt*1 that have skin issues in order to generate digital twin images having such skin issues. The image simulation model, however, may be trained on images such as image 202_*dt*1 in order to determine how the skin issue would be effected based on treatment with a given product (e.g., a skin creme), and to generate a user-specific simulated image (e.g., an enhanced digital twin image such as 202*adtalt*) based the user-specific digital twin image and the user-specific product recommendation. Each of the images (e.g., digital twin image 202*a_dt*, digital twin image area 202*a_dt*1, digital twin enhanced image area 202*a_dt*1*alt*, and digital twin enhanced image 202*a_dtalt*) may comprise pixel data comprising feature data and corresponding to skin regions of respective users, within the respective image.

With respect to digital images as described herein, pixel data (e.g., pixel data 202*ap* of FIG. 4C) comprises individual points or squares of data within an image, where each point or square represents a single pixel (e.g., each of pixel 202*ap*1, pixel 202*ap*2, and pixel 202*ap*3) within an image. Each pixel may be at a specific location within an image. In addition, each pixel may have a specific color (or lack thereof). Pixel color may be determined by a color format and related channel data associated with a given pixel. For example, a popular color format is a 1976 CIELAB (also referenced herein as the "CIE L*-a*-b*" or simply "L*a*b*" color format) color format that is configured to mimic the human perception of color. Namely, the L*a*b* color format is designed such that the amount of numerical change in the three values representing the L*a*b* color format (e.g., L*, a*, and b*) corresponds roughly to the same amount of visually perceived change by a human. This color format is advantageous, for example, because the L*a*b* gamut (e.g., the complete subset of colors included as part of the color format) includes both the gamuts of Red (R), Green (G), and Blue (B) (collectively RGB) and Cyan (C), Magenta (M), Yellow (Y), and Black (K) (collectively CMYK) color formats.

In the L* a* b* color format, color is viewed as point in three-dimensional space, as defined by the three-dimensional coordinate system (L*, a*, b*), where each of the L* data, the a* data, and the b* data may correspond to individual color channels, and may therefore be referenced as channel data. In this three-dimensional coordinate system, the L* axis describes the brightness (luminance) of the color with values from 0 (black) to 100 (white). The a* axis describes the green or red ratio of a color with positive a* values (+a*) indicating red hue and negative a* values (−a*) indicating green hue. The b* axis describes the blue or yellow ratio of a color with positive b* values (+b*) indicating yellow hue and negative b* values (−b*) indicating blue hue. Generally, the values corresponding to the a* and b* axes may be unbounded, such that the a* and b* axes may include any suitable numerical values to express the axis boundaries. However, the a* and b* axes may typically include lower and upper boundaries that range from approximately 150 to −150. Thus, in this manner, each pixel color value may be represented as a three-tuple of the L*, a*, and b* values to create a final color for a given pixel.

As another example, a popular color format includes the red-green-blue (RGB) format having red, green, and blue channels. That is, in the RGB format, data of a pixel is represented by three numerical RGB components (Red, Green, Blue), that may be referred to as a channel data, to manipulate the color of pixel's area within the image. In some implementations, the three RGB components may be represented as three 8-bit numbers for each pixel. Three 8-bit bytes (one byte for each of RGB) may be used to generate 24-bit color. Each 8-bit RGB component can have 256 possible values, ranging from 0 to 255 (i.e., in the base 2 binary system, an 8-bit byte can contain one of 256 numeric values ranging from 0 to 255). This channel data (R, G, and B) can be assigned a value from 0 to 255 that can be used to set the pixel's color. For example, three values like (250, 165, 0), meaning (Red=250, Green=165, Blue=0), can denote one Orange pixel. As a further example, (Red=255, Green=255, Blue=0) means Red and Green, each fully saturated (255 is as bright as 8 bits can be), with no Blue (zero), with the resulting color being Yellow. As a still further example, the color black has an RGB value of (Red=0, Green=0, Blue=0) and white has an RGB value of (Red=255, Green=255, Blue=255). Gray has the property of having equal or similar RGB values, for example, (Red=220, Green=220, Blue=220) is a light gray (near white), and (Red=40, Green=40, Blue=40) is a dark gray (near black).

In this way, the composite of three RGB values creates a final color for a given pixel. With a 24-bit RGB color image, using 3 bytes to define a color, there can be 256 shades of red, and 256 shades of green, and 256 shades of blue. This provides 256×256×256, i.e., 16.7 million possible combinations or colors for 24 bit RGB color images. As such, a pixel's RGB data value indicates a degree of color or light each of a Red, a Green, and a Blue pixel is comprised of. The three colors, and their intensity levels, are combined at that image pixel, i.e., at that pixel location on a display screen, to illuminate a display screen at that location with that color. In is to be understood, however, that other bit sizes, having fewer or more bits, e.g., 10-bits, may be used to result in fewer or more overall colors and ranges.

As a whole, the various pixels, positioned together in a grid pattern (e.g., pixel data 202ap), form a digital image or portion thereof. A single digital image can comprise thousands or millions of pixels. Images can be captured, generated, stored, and/or transmitted in a number of formats, such as JPEG, TIFF, PNG and GIF. These formats use pixels to store or represent the image.

With reference to FIG. 4C, example image 202_dt1 illustrates a skin region of a digital twin image (e.g., digital twin image 202a_dt) representing a user or individual (e.g., user 202a). More specifically, image 202_dt1 comprises pixel data, including pixel data 202ap defining the skin region representing the user's or individual's skin. Pixel data 202ap includes a plurality of pixels including pixel 202ap1, pixel 202ap2, and pixel 202ap3. In example image 202a_dt1, each of pixel 202ap1, pixel 202ap2, and pixel 202ap3 are representative of features of skin corresponding to image classifications or values of a skin region. Generally, in various embodiments, features of the skin or otherwise skin region of a user may comprise one or more of spots related to hemoglobin, spots related to melanin, and/or other skin conditions (e.g., acne). Each of these features may be determined from or otherwise based on one or more pixels in a digital image (e.g., image 202_dt1). For example, with respect to image 202_dt1, each of pixels 202ap1 and 202ap2 may be relatively light pixels (e.g., pixels with relatively high L* values) and/or relatively yellow pixels (e.g., pixels with relatively high or positive b* values) positioned within pixel data 202ap in a region of the user's skin, which may be indicative of regular or more common values of the user's skin. Pixel 202ap3 however, may comprise darker pixels (e.g., with negative or lower relative *L values) and/or redder or darker pixels (e.g., positive or higher relative a* values), which may be indicative of a melanin (e.g., brown hued) or hemoglobin (e.g., red hued) related spot, respectively, at that location in the image representative of the user's skin. Such pixel features may be used to train an AI model, such as synthetic image generation model to output similar images having similar features and/or image simulation model to output an enhanced image having similar, but improved skin features depicting the skin following treatment with a recommend product. In addition to pixels 202ap1, 202ap2, and 202ap3, pixel data 202ap includes various other pixels including remaining portions of the user's skin, including various other skin regions and/or portions of skin that may be analyzed and/or used for training of model(s), such as those described herein. For example, pixel data 202ap further includes pixels representative of features of spots, and, in various aspects, in addition to the color of a spot, the grouping of such pixels at a particular location in the image, where such pixels having similar L*a*b* and/or RGB values, provides training information for skin identification, classification, and/or enhancement as described herein.

In some implementations, a prediction or classification value may be generated or calculated indicating a spot type (e.g., a hemoglobin and/or melanin spot type). For example, FIGS. 4B and 4C illustrate images 202a_dt and 202a_dt1 having a classification of a melanin spot type (e.g., a melanin related spot 202ar3), which can be based on, for example, pixel data at the port 202ar3, such as pixel 202ap3. In some aspects, the spot type or otherwise spot classification or value may be identified by spot identifiers (IDs), where values or classifications of spot IDs may comprise a range (e.g., IDs 1-20) for identifying various levels of pigmentations or intensities of the skin (e.g., caused by hemoglobin, melanin, acne, etc.) as identifiable within the pixel data based on pixel values (e.g., RGB and/or L*a*b* values). For example, as shown for FIG. 4C, pixel 202ap3 is associated with a spot ID value or classification of "14" (indicated by textual rendering 202at1) indicating that melanin related spot 202ar3 has a relatively high value or classification of a spot ID range of 1-20. It is to be understood that additional and/or different spot IDs, e.g., classifications, values, and/or ranges, may be used to detect or classify additional and/or different types of spots or discolorations on a user skin.

In some implementations, a digital image, such as a training image, or an image as output by an AI model, or otherwise a digital image (e.g., any of digital twin image 202a_dt, digital twin image area 202a_dt1, digital twin enhanced image area 202a_dt1, and digital twin enhanced image 202a_dtalt)), may be or may comprise a cropped image. Generally, a cropped image is an image with one or more pixels removed, deleted, or hidden from an originally captured image. In some aspects, a cropped image may comprise an image depicting the skin region having a one or more instances of a skin issue, such as a spot feature. For example, with reference to FIG. 4C, image 202_dt1 represents at least a portion of an original image, e.g., digital twin image 202a_dt. Cropped portion 202ac1 represents a first cropped portion of image 202_*dt*1 that removes portions of the skin area (outside of cropped portion 202*ac*1) that may not include readily identifiable spot features and/or other skin issues. As a further example, cropped portion 202*ac*2 represents a second cropped portion of image 202_*dt*1 that removes portions of the image (outside of cropped portion 202*ac*2) that may not include spot features and/or other skin issues that are as readily identifiable as the features included in the cropped portion 202*ac*2, and may therefore be less useful as training data and/or as output of a given AI model, e.g., an synthetic image generation model and/or an image simulation model. In various embodiments, analyzing and/or use of cropped images for training yields improved accuracy the AI models as described herein. It also improves the efficiency and performance of the underlying computer system in that such system processes, stores, and/or transfers smaller size digital images. Still further, images may be stored as cropped or that otherwise include extracted or depicted skin regions of a user without depicting personal identifiable information (PII) of the user. Such cropped images provide a security improvement, i.e., where the removal of PII provides an improvement over prior systems because cropped or redacted images, especially ones that may be accessed over a network (e.g., the Internet), are more secure without including PI information of a user. Importantly, the systems and methods described herein may operate without the need for such non-essential information, which provides an improvement, e.g., a security and a performance improvement, over conventional systems. Moreover, while FIG. 4C may depict and describe a cropped image, it is to be understood, however, that other image types including, but not limited to, original, non-cropped images (e.g., digital twin image 202*a*_*dt*) and/or other types/sizes of cropped images (e.g., cropped portion 202*ac*1 of image 202_*dt*1) may be used or substituted as well.

It is to be understood that the disclosure for image 202_*dt*1 of FIG. 4C applies the same or similarly for other digital images described herein, including, for example, for digital twin images as described for FIG. 4A, where such images also comprise pixels that may be analyzed and/or used for training of model(s) as described herein.

In addition, digital images of a skin area (e.g., digital twin image area 202_*dt*1), may depict various skin features, which may be used to train a given AI model and/or generate output from such AI model, such as, for example the synthetic image generation model and/or the image simulation model as described herein. For example, as illustrated for FIGS. 4B and/or 4C, the skin regions of these users comprise skin features (e.g., spots) of the user's skin regions identifiable with the pixel data of the respective images. These skin features include, for example, features indicative of hemoglobin, melanin, and/or other skin conditions (e.g., acne), which can comprise discrete skin regions or features (e.g., spots) at one or more locations distributed across the user's skin. In addition, as described herein for FIGS. 5A and 5B also illustrate examples depicting skin regions with reduced or eliminated skin features (e.g., spots) of the user's skin regions identifiable with the pixel data of the respective images. These reduced or eliminated skin features include, for example, features having pixel data of reduced and/or eliminated hemoglobin, melanin, and/or other skin conditions (e.g., acne), which can be reduced and/or eliminated by application of a skin care product. These reduced and/or eliminated pixel regions can comprise discrete skin regions or features (e.g., spots) at one or more locations distributed across the user's skin, e.g., for example as shown for FIGS. 5A and/or 5B.

The pixel data of given images may be used to train image-based AI models, including, for example, synthetic image generation model and/or image simulation model. For example, synthetic image generation model may be trained with pixel data of a plurality of images of users (e.g., of different demographics and/or phenotypes) as well as pixel data of a plurality of images of skin conditions or issues (e.g., similar to image twin image area 202_*dt*1 of FIG. 4C), where such images have pixel data representing different users of different demographics, phenotypes, and skin issues or conditions. Synthetic image generation model may be configured or trained to output digital twin images that have the skin conditions or issues for a user of given demographic with certain phenotypes. As a further example, image simulation model may be trained on pixel data of the plurality of images of users (e.g., of different demographics and/or phenotypes) as well as pixel data of a plurality of images of skin conditions or issues (e.g., similar to image twin image area 202_*dt*1*alt* of FIG. 5A), where skin has been treated by a specific skin care product. The pixels of images may depict a reduced and/or mitigated skin conditions issues as reduced and/or mitigated pixel features, e.g., as shown for FIGS. 5A and 5B. In this way, the output of the image simulation model may comprise a user-specific simulated image (e.g., image twin image area 202_*dt*1*alt* of FIG. 5A and/or image twin image 202_*dtalt* of FIG. 5B) graphically depicting a user-specific digital twin image graphically enhanced (e.g., a pixel enhancement) based on a user-specific product recommendation.

FIG. 5A illustrates an example image (e.g., digital twin enhanced image area 202*a*_*dt*1*alt*) as enhanced by an image simulation model, in accordance with various embodiments disclosed herein. For example, as described herein (e.g., for FIGS. 2A and 2B), image simulation model can receive as input a user-specific digital twin image and a user-specific product recommendation. In the example of FIG. 5A, the user-specific digital twin image input into image simulation model may comprise a digital twin image 202*a*_*dt* as selected or generated for user 202*a*. The user-specific product recommendation may comprise a skin creme for treating a skin condition or issue of the user 202*a*. For the example of FIGS. 4B, 4C, 5A, and 5B, and with respect to user 202*a*, the skin condition or issue involves increased melanin, e.g., a melanin related spot 202*ar*3 as shown for FIG. 4A. User 202*a* would have described the skin condition or issue during provision of natural language data (e.g., via LLM interface 300). The natural language data may also include the user's description a location of a melanin related spot, e.g., in a skin area 202*ar* of user's left cheek as shown for FIGS. 4A, 4B, 5A, and 5B.

As shown for FIG. 5A, digital twin enhanced image area 202*a*_*dt*1*alt* comprises pixel data 202*apalt*, which corresponds to pixel data of 202*ap* of FIG. 4C. Pixel data 202*apalt*, as well as the remaining portion of digital twin enhanced image area 202*a*_*dt*1*alt*, comprises individual points or squares of data, where each point or square represents a single pixel within the image. As shown for FIG. 5A, pixels associated with melanin (e.g., a melanin related spot 202*ar*3 as shown for FIG. 4A) are enhanced or otherwise updated showing the melanin related skin condition or issue (e.g., dark hued pixels such as pixel 202*ap*3) as reduced or removed, demonstrating the effect or otherwise efficacy of the user-specific product recommendation (e.g., a skin creme product) for treating a skin condition or issue of the user 202*a*. In addition, the melanin related skin condition or issue is reduced or removed at the same location or skin area of user 202a's face, e.g., in a skin area of user's left cheek.

Further, as shown for FIG. 5A, graphical representation (e.g., image 202_dt1alt) of the user is annotated with one or more graphics (e.g., areas of pixel data 202apalt) or textual rendering(s) (e.g., text 202at2) corresponding to various features identifiable within the pixel data comprising a portion of a skin region of the user. For example, in some implementations, the area of pixel data 202apalt may be annotated with or overlaid on top of the image of the user (e.g., image 202_dt1alt) to highlight the area or feature(s) identified within the pixel data (e.g., feature data and/or raw pixel data) by the image simulation model or another of the AI models 108. In the example of FIG. 5A, the area of pixel data 202apalt indicates features, as defined in pixel data and as defined by a spot ID, classification, or value (e.g., value "3" as shown for text 202at2), indicating a reduction or elimination of a hemoglobin and/or melanin spot (e.g., reduction and/or elimination of pixels at or near 202ap3 as described for FIG. 4C). In other implementations, the spot ID, classification, and/or value (e.g., value "3" as shown for text 202at2) is not shown or displayed even though the pixels at or near that skin area of pixel data 202apalt are associated with such a spot ID, classification, and/or value.

FIG. 5B illustrates a further example image (e.g., digital twin enhanced image 202a_dtalt) as enhanced by an image simulation model, in accordance with various embodiments disclosed herein. FIG. 5B is an example of a simulated imaged as graphically enhanced in accordance with the disclosure herein. For example, as described herein (e.g., for FIGS. 2A and 2B), image simulation model can receive as input a user-specific digital twin image and a user-specific product recommendation. In the example of FIG. 5B, the user-specific digital twin image input into image simulation model may comprise a digital twin image 202a_dt as selected or generated for user 202a. In the example of FIGS. 5A & 5B, digital twin enhanced image area 202a_dt1alt of FIG. 5A represents and is depicted as a zoomed or cropped version of digital twin image 202a_dtalt. The pixel data 202apalt corresponds to skin area 202aralt of FIG. 5B. In one implementation, digital twin enhanced image 202a_dtalt may comprise an image as outputted by image simulation model, where, for example, image simulation model is trained to output digital twin enhanced image 202a_dtalt as having image enhancements. Additionally, or alternatively, in a different implementation, image simulation model may first output digital twin enhanced image area 202a_dt1alt (as described for FIG. 5B). Then digital twin enhanced image area 202a_dt1alt can be superimposed or overlayed onto digital twin image 202a_dt, at or around skin area 202aralt, to generate digital twin enhanced image area 202a_dt1alt. In either implementation, and as shown for FIG. 5B, pixels previously associated with melanin (e.g., a melanin related spot 202ar3 as shown for FIG. 4A) are enhanced or otherwise updated showing the melanin (e.g., dark hued area illustrating the skin condition or issue of skin area 202ar) as reduced or removed, demonstrating the effect or otherwise efficacy of the user-specific product recommendation (e.g., a skin creme product) for treating a skin condition or issue of the user 202a. In this way, digital twin enhanced image 202a_dtalt comprises a user-specific simulated image graphically depicting the user-specific digital twin image (i.e., digital twin image 202a_dt) as graphically enhanced based on the user-specific product recommendation.

Figure 6:
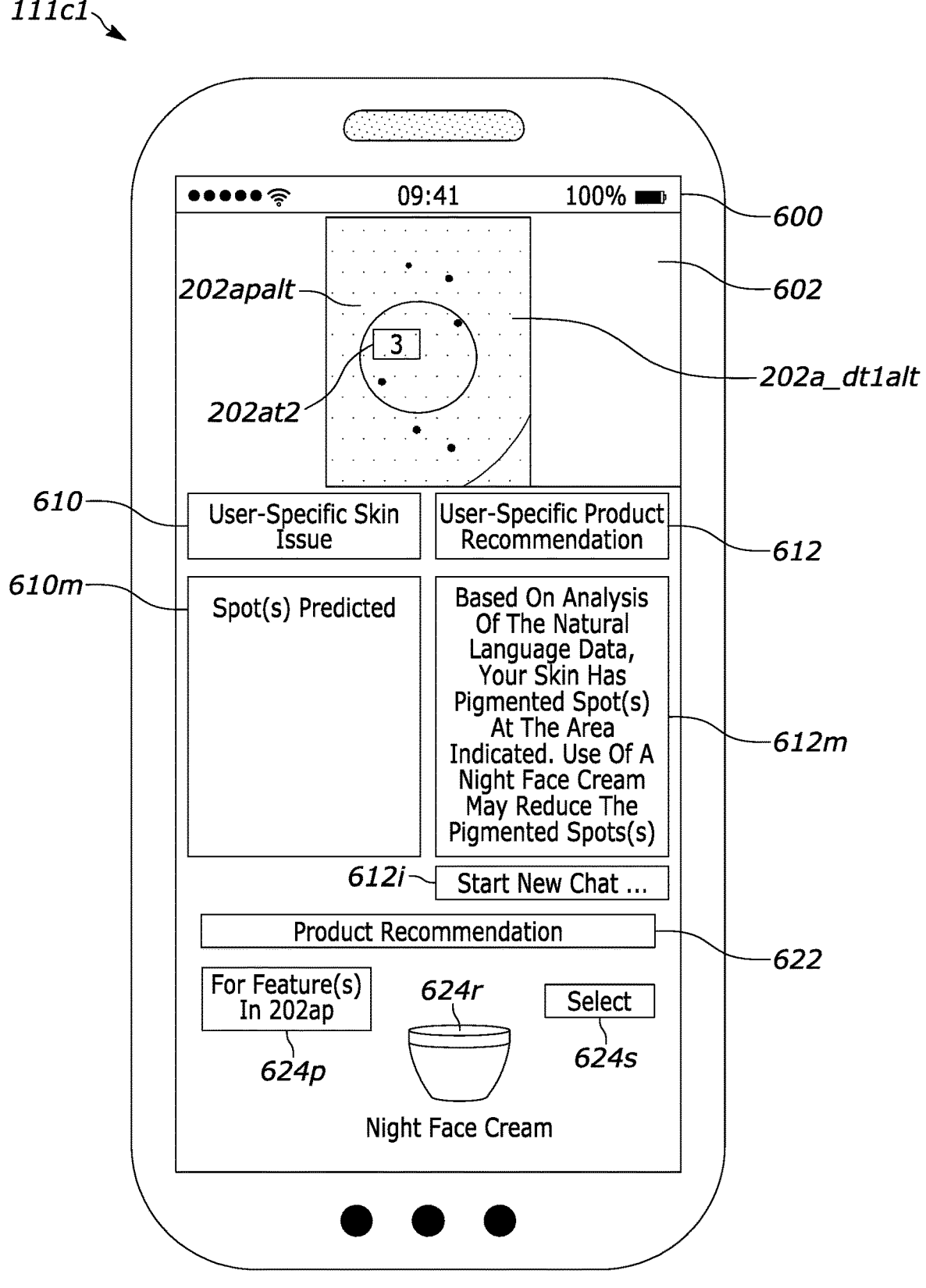
FIG. 6 illustrates an example user interface as rendered on a display screen of a user computing device, in accordance with various embodiments disclosed herein.

FIG. 6 illustrates an example user interface 602 as rendered on a display screen 600 of a user computing device (e.g., user computing device 111c1) in accordance with various embodiments disclosed herein. For example, as shown in the example of FIG. 6, user interface 602 may be implemented or rendered via an application (app) executing on user computing device 111c1. For example, as shown in the example of FIG. 6, user interface 602 may be implemented or rendered via a native app executing on user computing device 111c1. In the example of FIG. 6, user computing device 111c1 is a user computer device as described for FIG. 1, e.g., where 111c1 is illustrated as an APPLE iPhone that implements the APPLE iOS operating system and that has display screen 600. User computing device 111c1 may execute one or more native applications (apps) on its operating system, including, for example, imaging app as described herein. Such native apps may be implemented or coded (e.g., as computing instructions) in a computing language (e.g., SWIFT) executable by the user computing device operating system (e.g., APPLE iOS) by the processor of user computing device 111c1.

Additionally, or alternatively, user interface 602 may be implemented or rendered via a web interface, such as via a web browser application, e.g., Safari and/or Google Chrome app(s), or other such web browser or the like.

As shown in the example of FIG. 6, user interface 602 comprises a graphical representation (e.g., of image 202_dt1alt or portion thereof) of a user's skin. Image 202_dt1alt may comprise the enhanced digital twin image of a user, e.g., user 202a (or graphical representation thereof) comprising pixel data (e.g., pixel data 202apalt) of at least a portion of a skin region of the user's skin as described herein. In the example of FIG. 6, graphical representation (e.g., image 202_dt1alt) of the user is annotated with one or more graphics (e.g., areas of pixel data 202apalt) or textual rendering(s) (e.g., text 202at2) corresponding to various features identifiable within the pixel data comprising a portion of a skin region of the user. For example, in some implementations, the area of pixel data 202apalt may be annotated with or overlaid on top of the image of the user (e.g., image 202_dt1alt) to highlight the area or feature(s) identified within the pixel data (e.g., feature data and/or raw pixel data) by the image simulation model or other of the AI models 108. In the example of FIG. 6, the area of pixel data 202apalt indicates features, as defined in pixel data and as defined by a spot ID, classification, or value (e.g., value "3" as shown for text 202at2), indicating a reduction or elimination of a pigmented spot (e.g., reduction and/or elimination of pixels at or near 202ap3 as described for FIG. 4C). In various aspects, the pixels identified as the specific features (e.g., any one of pixels 202ap1-3), may be highlighted or otherwise annotated when rendered on display screen 600. In other implementations, the spot ID, classification, and/or value (e.g., value "3" as shown for text 202at2) is not shown or displayed even though the pixels at or near that skin area of pixel data 202apalt are associated with such a spot ID, classification, and/or value.

Textual rendering (e.g., text 202at2) shows a user-specific attribute or feature (e.g., value "3") which may indicate that the pixel(s) near or at pixel 202ap3, which previously had a spot ID or value of 14 for coloring of the skin at that area (see FIG. 4C), have been enhanced showing the skin issue or condition (e.g., the spot) as eliminated or reduced. For example, the value of "3" may indicate that a spot ID (e.g., on a scale of 1-20) is reduced in value or classification (e.g., an improved result) as depicted in image 202a_dt1alt, where the pixel values or updated to show improved skin. Such depiction is an implementation depicting what the user's skin is predicted to appear like after using a recommended product to improve their skin quality and or appearance (e.g., to normalize the spot or otherwise skin discoloration). It is to be understood that other textual rendering types, classifications, values, and/or ranges are contemplated herein, where textual rendering types, classifications, values may be rendered, for example, such as spot IDs for melanin, hemoglobin, acne, and/or other skin conditions or issues. Additionally, or alternatively, color values may be used and/or overlaid on a graphical representation shown on user interface 602 (e.g., image 202_dt1alt) to indicate a degree or quality of a given spot ID, e.g., a high ID of 17 or a low ID of 2 (e.g., low RGB and/or L*a*b* pixel values), or otherwise. The IDs may be provided as raw values, absolute scores, percentage based, IDs. Additionally, or alternatively, such IDs may be presented with textual or graphical indicators indicating whether or not an ID is representative of positive results (e.g., low discoloration indicating low sun exposure or skin irritation), negative results (e.g., high discoloration indicating excessive sun exposure or skin irritation), or acceptable results (average or acceptable values).

User interface 602 may also include or render a user-specific skin issue 610. In the embodiment of FIG. 6, the user-specific skin issue 610 comprises a message 610m to the user designed to indicate a user-specific prediction the user, along with a brief description of any reasons resulting in prediction. The output may comprise natural language data based on a determination, e.g., by the AI models 108 and/or 108a.

User interface 602 may also include or render a user-specific product recommendation 612. For example, the imaging app may render, on a display screen of a computing device, at least one user-specific product recommendation based on the user-specific prediction and/or simulated image. In various aspects, the user-specific skin recommendation may comprise a textual recommendation, an imaged based recommendation, and/or virtual rendering of the at least the portion of the skin region of the user. For example, as shown in the example of FIG. 6, message 612m indicates to a user that the user-specific issue and/or condition is mild and further indicates to the user that the skin condition or issue results from pigmented spots at the indicated region of the user's skin. As shown in the example of FIG. 6, message 612m recommends to the user to use a night face cream to help reduce the pigmented spots. The night face cream product may be a composition of hydroxycinnamic acids (HCAs) and niacinamide at a low pH as described herein. The product recommendation can be made based on the spot ID (e.g., value 14) suggesting that the image of the user depicts a mild degree of discoloration, where the night cream product is designed to address discoloration detected or classified in the pixel data of image 202_dt1 or otherwise assumed based on the spot ID, or classification, as output by AI models based on the natural language data and/or digital twin image. The product recommendation can be correlated to the identified feature within the pixel data, and the user computing device 111c1 and/or server(s) 102 can be instructed to output the product recommendation when the feature (e.g., a pigmented spot such as hyper melanin) is identified or classified.

User interface 602 may also include or render a section for a specific product recommendation 622 for a manufactured product 624r (e.g., night face cream as described above). The product recommendation 622 may correspond to the user-specific product recommendation 612, as described above. For example, in the example of FIG. 6, the user-specific product recommendation 612 may be displayed on display screen 600 of user computing device 111c1 with instructions (e.g., message 612m) for treating, with the manufactured product (manufactured product 624r (e.g., night face cream)) at least one feature (e.g., mild spot ID of 14 related to pigmented spots, such as melanin at pixels near or at 202ap3) identifiable in the pixel data (e.g., pixel data 202ap) comprising pixel data of at least a portion of a skin region of the user's skin.

As shown in FIG. 6, user interface 602 recommends a product (e.g., manufactured product 624r (e.g., night face cream)) based on the user-specific product recommendation 612. The output or analysis of image(s) (e.g., image 202_dt1) of an AI model (e.g., AI models 108 and/or 108a), e.g., user-specific skin issue 610 and/or the user-specific product recommendation 612, may be used to generate or identify recommendations for corresponding product(s). Such recommendations may include products such as night face cream, skin exfoliants, skin moisturizers, moisturizing treatments, information about avoiding excessive sun exposure, and the like to address the user-specific issue as detected within the pixel data by the AI models model (e.g., AI models 108 and/or 108a).

In the example of FIG. 6, user interface 602 renders or provides a recommended product (e.g., manufactured product 624r) as determined by the AI models and/or its related image analysis of image 202_dt1, its pixel data and/or the natural language data of the user, including phenotype and/or demographic data. In the example of FIG. 6, this is indicated and annotated (624p) on user interface 602.

User interface 602 may further include a selectable UI button 624s to allow the user (e.g., user 202a) to select for purchase or shipment the corresponding product (e.g., manufactured product 624r). In some embodiments, selection of selectable UI button 624s may cause the recommended product(s) to be shipped to the user (e.g., user of image 202a) and/or may notify a third party that the individual is interested in the product(s). For example, either user computing device 111c1 and/or server(s) 102 may initiate, based on the user-specific skin issue 610 and/or the user-specific product recommendation 612, the manufactured product 624r (e.g., night face cream) for shipment to the user. In such embodiments, the product may be packaged and shipped to the user.

In some implementations, a graphical representation (e.g., image 202_dt1alt), with graphical annotations (e.g., area of pixel data 202apalt), textual annotations (e.g., text 202at2), the user-specific skin issue 610, and the user-specific product recommendation 612 may be transmitted, via the computer network (e.g., from server 102 and/or one or more processors) to user computing device 111c1, for rendering on display screen 600. In other embodiments, no transmission to the server of the user's specific image occurs, where the user-specific skin issue 610, the user-specific product recommendation 612 (and/or product specific recommendation) may instead be generated locally, by the AI models (e.g., AI models 108a) executing and/or implemented on the user's mobile device (e.g., user computing device 111c1) and rendered, by a processor of the mobile device, on display screen 600 of the mobile device (e.g., user computing device 111c1).

In some embodiments, any one or more of graphical representations (e.g., image 202_dt1alt), with graphical annotations (e.g., area of pixel data 202ap), textual annotations (e.g., text 202at2), user-specific skin issue 610, user-specific product recommendation 612, and/or product recommendation 622 may be rendered (e.g., rendered locally on display screen 600) in real-time or near-real time during or after receiving, the image having the skin region of the user's skin. In embodiments where the image is analyzed by server(s) 102, the image may be transmitted and analyzed in real-time or near real-time by server(s) 102.

In some embodiments, the user may provide additional natural language data that may be transmitted to server(s) 102 for updating, retraining, or reanalyzing by AI models 108. In other embodiments, natural language data may be locally received on computing device 111c1 and analyzed, by AI models 108a, on the computing device 111c1. For example, as shown in the example of FIG. 6, the user may select selectable button 612i for reanalyzing (e.g., either locally at computing device 111c1 or remotely at server(s) 102) new natural language data. Selectable button 612i may cause user interface 602 to prompt the user to initiate a chat, e.g., such as launching or displaying LLM interface 300. Server(s) 102 and/or a user computing device such as user computing device 111c1 may receive natural language data regarding phenotype data and/or demographic data of the user. The natural language data may be used to generate a digital twin image, make a product recommendation, and/or generate a simulated image of the digital twin image after application of the recommend product. The simulated image may include graphical enhancements, e.g., depicting and predicting how the user would successfully use night face cream to reduce melanin and/or hemoglobin as detected with the pixel data of the new image. A comment may include that the user needs to correct features detected within the pixel data, e.g., any additional spots, by applying an additional product, e.g., moisturizing oil or the like.

Aspects of the Disclosure

The following aspects are provided as examples in accordance with the disclosure herein and are not intended to limit the scope of the disclosure.

1. An artificial intelligence (AI)-based system configured to provide personalized skin product recommendations, the AI-based system comprising: one or more processors; one or more memories communicatively coupled to the one or more processors; an application (app) stored in the one or more memories and comprising computing instructions configured to execute on the one or more processors; a natural language model, accessible by the app, and trained with natural language data and demographic data of respective users, the natural language model configured to output one or more phenotype classifications corresponding to one or more phenotypes of the respective users, and the natural language model further configured to output one or more demographic classifications corresponding to one or more demographic attributes of the respective users; a synthetic image generation model, accessible by the app, and trained on a plurality of images corresponding to the one or more phenotype classifications and the one or more demographic classifications as outputted by the natural language model, the synthetic image generation model configured to output digital twin images of the respective users based on the plurality of images corresponding to the one or more phenotype classifications and the one or more demographic classifications of the respective users as input; a product recommendation model, accessible by the app, and trained on the digital twin images of the respective users as outputted by the synthetic image generation model, the product recommendation model further trained on the one or more phenotype classifications and the one or more demographic classifications, the product recommendation model configured to output product recommendations for the respective users based on the digital twin images, the one or more phenotype classifications, and the one or more demographic classifications as input; an image simulation model, accessible by the app, and trained on the digital twin images as outputted by the synthetic image generation model and further trained on the product recommendations as outputted by the product recommendation model, the product recommendation model further trained on the one or more phenotype classifications and the one or more demographic classifications, the image simulation model configured to generate simulated images based the digital twin images with one or more graphical enhancements based on the product recommendations; and, wherein the computing instructions of the app when executed by the one or more processors, cause the one or more processors to: (a) receive user-specific natural language data of a user, the natural language data defining user-specific phenotype information and user-specific demographic data of the user, (b) input the user-specific natural language data into the natural language model, wherein the natural language model generates one or more user-specific phenotype classifications and one or more user-specific demographic classifications defining the user, (c) input the one or more user-specific phenotype classifications and the one or more user-specific demographic classifications into the synthetic image generation model, wherein the synthetic image generation model generates a user-specific digital twin image of the user, (d) input the user-specific digital twin image of the user, the one or more phenotype classifications of the user, and the one or more demographic classifications of the user into the product recommendation model, wherein the product recommendation model generates a user-specific product recommendation for the user, the user-specific product recommendation designed to address at least one issue identified in the user-specific digital twin image or the one or more user-specific phenotype classifications, (e) input the user-specific digital twin image, the user-specific product recommendation, the one or more phenotype classifications of the user, and the one or more demographic classifications of the user into the image simulation model, wherein the image simulation model generates a user-specific simulated image based the user-specific digital twin image and the user-specific product recommendation, the user-specific simulated image graphically depicting the user-specific digital twin image graphically enhanced based on the user-specific product recommendation, and (f) output natural language data to the user describing the user-specific product recommendation; and (g) display, on a display screen, the user-specific simulated image.

2. The AI-based system of aspect 1, wherein the one or more phenotype classifications or demographic classifications comprise one or more of: (a) a gender type classification; (b) an age type classification; (c) an ethnicity type classification; or (d) a skin concern type classification.

3. The AI-based system of any one of aspects 1 or 2, wherein the natural language model comprises a large language model.

4. The AI-based system of any one of aspects 1-3 further comprising an imaging model trained on one or more respective images of the respective users, wherein the imaging model is further configured to output the one or more phenotype classifications corresponding to one or more phenotypes of the respective users.

5. The AI-based system of aspect 4, wherein an output of the natural language model and an output of the imaging model is combined to determine the one or more phenotypes of the respective users.

6. The AI-based system of any one of aspects 1-5, wherein the synthetic image generation model comprises an AI model configured to generate photorealistic images, wherein the digital twin images comprise photorealistic images, and wherein the user-specific digital twin image comprises a photorealistic image of the user.

7. The AI-based system of any one of aspects 1-6, wherein the product recommendation model comprises a model trained to determine efficacy of one or more skin products corresponding to the one or more phenotypes of the respective users.

8. The AI-based system of any one of aspects 1-7, wherein the image simulation model comprises a model trained to determine effects of one or more product attributes corresponding to respective products of the product recommendations.

9. The AI-based system of any one of aspects 1-8 further comprising: providing the user-specific digital twin image to the user; receiving additional user-specific natural language data from the user for manipulating the user-specific digital twin image; and updating the user-specific digital twin image based on the additional user-specific natural language data.

10. The AI-based system of any one of aspects 1-9, wherein the user-specific simulated image is rendered on the display screen in real-time or near-real time, during, or after receiving, the natural language data of the user.

11. The AI-based system of any one of aspects 1-10, wherein the user-specific product recommendation comprises a product recommendation for a manufactured product.

12. The AI-based system of aspect 11, wherein the user-specific product recommendation is displayed on the display screen with instructions for treating, with the manufactured product, at least one feature identifiable in pixel data comprising a skin region of the user.

13. The AI-based system of aspect 11, wherein the computing instructions further cause the one or more processors to: initiate, based on the user-specific product recommendation, the manufactured product for shipment to the user.

14. The AI-based system of any one of aspects 1-13, wherein at least one of the one or more processors comprises a processor of a mobile device.

15. The AI-based system of any one of aspects 1-14, wherein the one or more processors comprises a server processor of a server, wherein the server is communicatively coupled to a computing device via a computer network, and where the app comprises a server app portion configured to execute on the one or more processors of the server and a computing device app portion configured to execute on one or more processors of the computing device, the server app portion configured to communicate with the computing device app portion, wherein the server app portion is configured to implement one or more of instructions a-g of any one of aspects 1-x.

16. An artificial intelligence (AI)-based method for providing personalized skin product recommendations, the AI-based method comprising: implementing a multiple AI model training phase comprising: training, by one or more processors, a natural language model with natural language data and demographic data of respective users, the natural language model configured to output one or more phenotype classifications corresponding to one or more phenotypes of the respective users, and the natural language model further configured to output one or more demographic classifications corresponding to one or more demographic attributes of the respective users; training, by the one or more processors, a synthetic image generation model on a plurality of images corresponding to the one or more phenotype classifications and the one or more demographic classifications as outputted by the natural language model, the synthetic image generation model configured to output digital twin images of the respective users based on the plurality of images corresponding to the one or more phenotype classifications and the one or more demographic classifications of the respective users as input; training, by the one or more processors, a product recommendation model on the digital twin images of the respective users as outputted by the synthetic image generation model, the product recommendation model further trained on the one or more phenotype classifications and the one or more demographic classifications, the product recommendation model configured to output product recommendations for the respective users based on the digital twin images, the one or more phenotype classifications, and the one or more demographic classifications as input; training, by the one or more processors, an image simulation model on the digital twin images as outputted by the synthetic image generation model and further trained on the product recommendations as outputted by the product recommendation model, the product recommendation model further trained on the one or more phenotype classifications and the one or more demographic classifications, the image simulation model configured to generate simulated images based the digital twin images with one or more graphical enhancements based on the product recommendations, wherein each of the natural language model, the synthetic image generation model, the product recommendation model, and the image simulation model is stored in one or more memories accessible by an application (app) comprising computing instructions stored in the one or more memories, the one or more memories communicatively coupled to the one or more processors; and; implementing a multiple AI model execution phase comprising: (a) receiving, by the app, user-specific natural language data of a user, the natural language data defining user-specific phenotype information and user-specific demographic data of the user; (b) inputting, by the app, the user-specific natural language data into the natural language model, wherein the natural language model generates one or more user-specific phenotype classifications and one or more user-specific demographic classifications defining the user; (c) inputting, by the app, the one or more user-specific phenotype classifications and the one or more user-specific demographic classifications into the synthetic image generation model, wherein the synthetic image generation model generates a user-specific digital twin image of the user; (d) inputting, by the app, the user-specific digital twin image of the user, the one or more phenotype classifications of the user, and the one or more demographic classifications of the user into the product recommendation model, wherein the product recommendation model generates a user-specific product recommendation for the user, the user-specific product recommendation designed to address at least one issue identified in the user-specific digital twin image or the one or more user-specific phenotype classifications; (e) inputting, by the app, the user-specific digital twin image, the user-specific product recommendation, the one or more phenotype classifications of the user, and the one or more demographic classifications of the user into the image simulation model, wherein the image simulation model generates a user-specific simulated image based the user-specific digital twin image and the user-specific product recommendation, the user-specific simulated image graphically depicting the user-specific digital twin image graphically enhanced based on the user-specific product recommendation; (f) outputting, by the app, natural language data to the user describing the user-specific product recommendation; and (g) displaying, by the app on a display screen, the user-specific simulated image.

17. The AI-based method of aspect 16, wherein the one or more phenotype classifications or demographic classifications comprise one or more of: (a) a gender type classification; (b) an age type classification; (c) an ethnicity type classification; or (d) a skin concern type classification.

18. The AI-based method of any one of aspects 16-17, wherein the natural language model comprises a large language model.

19. The AI-based method of any one of aspects 16-18 further comprising an imaging model trained on one or more respective images of the respective users, wherein the imaging model is further configured to output the one or more phenotype classifications corresponding to one or more phenotypes of the respective users, wherein an output of the natural language model and an output of the imaging model is combined to determine the one or more phenotypes of the respective users.

20. A tangible, non-transitory computer-readable medium storing instructions for providing personalized skin product recommendations, that when executed by one or more processors cause the one or more processors to: implement a multiple AI model training phase comprising: training, by one or more processors, a natural language model with natural language data and demographic data of respective users, the natural language model configured to output one or more phenotype classifications corresponding to one or more phenotypes of the respective users, and the natural language model further configured to output one or more demographic classifications corresponding to one or more demographic attributes of the respective users; training, by the one or more processors, a synthetic image generation model on a plurality of images corresponding to the one or more phenotype classifications and the one or more demographic classifications as outputted by the natural language model, the synthetic image generation model configured to output digital twin images of the respective users based on the plurality of images corresponding to the one or more phenotype classifications and the one or more demographic classifications of the respective users as input; training, by the one or more processors, a product recommendation model on the digital twin images of the respective users as outputted by the synthetic image generation model, the product recommendation model further trained on the one or more phenotype classifications and the one or more demographic classifications, the product recommendation model configured to output product recommendations for the respective users based on the digital twin images, the one or more phenotype classifications, and the one or more demographic classifications as input; training, by the one or more processors, an image simulation model on the digital twin images as outputted by the synthetic image generation model and further trained on the product recommendations as outputted by the product recommendation model, the product recommendation model further trained on the one or more phenotype classifications and the one or more demographic classifications, the image simulation model configured to generate simulated images based the digital twin images with one or more graphical enhancements based on the product recommendations, wherein each of the natural language model, the synthetic image generation model, the product recommendation model, and the image simulation model is stored in one or more memories accessible by an application (app) comprising computing instructions stored in the one or more memories, the one or more memories communicatively coupled to the one or more processors; and; implement a multiple AI model execution phase comprising: (a) receiving, by the app, user-specific natural language data of a user, the natural language data defining user-specific phenotype information and user-specific demographic data of the user; (b) inputting, by the app, the user-specific natural language data into the natural language model, wherein the natural language model generates one or more user-specific phenotype classifications and one or more user-specific demographic classifications defining the user; (c) inputting, by the app, the one or more user-specific phenotype classifications and the one or more user-specific demographic classifications into the synthetic image generation model, wherein the synthetic image generation model generates a user-specific digital twin image of the user; (d) inputting, by the app, the user-specific digital twin image of the user, the one or more phenotype classifications of the user, and the one or more demographic classifications of the user into the product recommendation model, wherein the product recommendation model generates a user-specific product recommendation for the user, the user-specific product recommendation designed to address at least one issue identified in the user-specific digital twin image or the one or more user-specific phenotype classifications; (e) inputting, by the app, the user-specific digital twin image, the user-specific product recommendation, the one or more phenotype classifications of the user, and the one or more demographic classifications of the user into the image simulation model, wherein the image simulation model generates a user-specific simulated image based the user-specific digital twin image and the user-specific product recommendation, the user-specific simulated image graphically depicting the user-specific digital twin image graphically enhanced based on the user-specific product recommendation; (f) outputting, by the app, natural language data to the user describing the user-specific product recommendation; and (g) displaying, by the app on a display screen, the user-specific simulated image.

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An artificial intelligence (AI)-based system configured to provide personalized skin product recommendations, the AI-based system comprising:

one or more processors;

one or more memories communicatively coupled to the one or more processors;

an application (app) stored in the one or more memories and comprising computing instructions configured to execute on the one or more processors;

a natural language model, accessible by the app, and trained with natural language data and demographic data of respective users, the natural language model configured to output one or more phenotype classifications corresponding to one or more phenotypes of the respective users, and the natural language model further configured to output one or more demographic classifications corresponding to one or more demographic attributes of the respective users;

a synthetic image generation model, accessible by the app, and trained on a plurality of images corresponding to the one or more phenotype classifications and the one or more demographic classifications as outputted by the natural language model, the synthetic image generation model configured to output digital twin images of the respective users based on the plurality of images corresponding to the one or more phenotype classifications and the one or more demographic classifications of the respective users as input;

a product recommendation model, accessible by the app, and trained on the digital twin images of the respective users as outputted by the synthetic image generation model, the product recommendation model further trained on the one or more phenotype classifications and the one or more demographic classifications, the product recommendation model configured to output product recommendations for the respective users based on the digital twin images, the one or more phenotype classifications, and the one or more demographic classifications as input;

an image simulation model, accessible by the app, and trained on the digital twin images as outputted by the synthetic image generation model and further trained on the product recommendations as outputted by the product recommendation model, the product recommendation model further trained on the one or more phenotype classifications and the one or more demographic classifications, the image simulation model configured to generate simulated images based the digital twin images with one or more graphical enhancements based on the product recommendations; and, wherein the computing instructions of the app when executed by the one or more processors, cause the one or more processors to:

(a) receive user-specific natural language data of a user, the natural language data defining user-specific phenotype information and user-specific demographic data of the user, (b) input the user-specific natural language data into the natural language model, wherein the natural language model generates one or more user-specific phenotype classifications and one or more user-specific demographic classifications defining the user, (c) input the one or more user-specific phenotype classifications and the one or more user-specific demographic classifications into the synthetic image generation model, wherein the synthetic image generation model generates a user-specific digital twin image of the user, (d) input the user-specific digital twin image of the user, the one or more phenotype classifications of the user, and the one or more demographic classifications of the user into the product recommendation model, wherein the product recommendation model generates a user-specific product recommendation for the user, the user-specific product recommendation designed to address at least one issue identified in the user-specific digital twin image or the one or more user-specific phenotype classifications, (e) input the user-specific digital twin image, the user-specific product recommendation, the one or more phenotype classifications of the user, and the one or more demographic classifications of the user into the image simulation model, wherein the image simulation model generates a user-specific simulated image based the user-specific digital twin image and the user-specific product recommendation, the user-specific simulated image graphically depicting the user-specific digital twin image graphically enhanced based on the user-specific product recommendation, and (f) output natural language data to the user describing the user-specific product recommendation; and (g) display, on a display screen, the user-specific simulated image.

2. The AI-based system of claim 1, wherein the one or more phenotype classifications or demographic classifications comprise one or more of: (a) a gender type classification; (b) an age type classification; (c) an ethnicity type classification; or (d) a skin concern type classification.

3. The AI-based system of claim 1, wherein the natural language model comprises a large language model.

4. The AI-based system of claim 1 further comprising an imaging model trained on one or more respective images of the respective users, wherein the imaging model is further configured to output the one or more phenotype classifications corresponding to one or more phenotypes of the respective users.

5. The AI-based system of claim 4, wherein an output of the natural language model and an output of the imaging model is combined to determine the one or more phenotypes of the respective users.

6. The AI-based system of claim 1, wherein the synthetic image generation model comprises an AI model configured to generate photorealistic images, wherein the digital twin images comprise photorealistic images, and wherein the user-specific digital twin image comprises a photorealistic image of the user.

7. The AI-based system of claim 1, wherein the product recommendation model comprises a model trained to determine efficacy of one or more skin products corresponding to the one or more phenotypes of the respective users.

8. The AI-based system of claim 1, wherein the image simulation model comprises a model trained to determine effects of one or more product attributes corresponding to respective products of the product recommendations.

9. The AI-based system of claim 1 further comprising:
providing the user-specific digital twin image to the user;
receiving additional user-specific natural language data from the user for manipulating the user-specific digital twin image; and
updating the user-specific digital twin image based on the additional user-specific natural language data.

10. The AI-based system of claim 1, wherein the user-specific simulated image is rendered on the display screen in real-time or near-real time, during, or after receiving, the natural language data of the user.

11. The AI-based system of claim 1, wherein the user-specific product recommendation comprises a product recommendation for a manufactured product.

12. The AI-based system of claim 11, wherein the user-specific product recommendation is displayed on the display screen with instructions for treating, with the manufactured product, at least one feature identifiable in pixel data comprising a skin region of the user.

13. The AI-based system of claim 11, wherein the computing instructions further cause the one or more processors to:
initiate, based on the user-specific product recommendation, the manufactured product for shipment to the user.

14. The AI-based system of claim 1, wherein at least one of the one or more processors comprises a processor of a mobile device.

15. The AI-based system of claim 1, wherein the one or more processors comprises a server processor of a server, wherein the server is communicatively coupled to a computing device via a computer network, and where the app comprises a server app portion configured to execute on the one or more processors of the server and a computing device app portion configured to execute on one or more processors of the computing device, the server app portion configured to communicate with the computing device app portion, wherein the server app portion is configured to implement one or more of instructions a-g of claim 1.

16. An artificial intelligence (AI)-based method for providing personalized skin product recommendations, the AI-based method comprising:

implementing a multiple AI model training phase comprising:

training, by one or more processors, a natural language model with natural language data and demographic data of respective users, the natural language model configured to output one or more phenotype classifications corresponding to one or more phenotypes of the respective users, and the natural language model further configured to output one or more demographic classifications corresponding to one or more demographic attributes of the respective users;

training, by the one or more processors, a synthetic image generation model on a plurality of images corresponding to the one or more phenotype classifications and the one or more demographic classifications as outputted by the natural language model, the synthetic image generation model configured to output digital twin images of the respective users based on the plurality of images corresponding to the one or more phenotype classifications and the one or more demographic classifications of the respective users as input;

training, by the one or more processors, a product recommendation model on the digital twin images of the respective users as outputted by the synthetic image generation model, the product recommendation model further trained on the one or more phenotype classifications and the one or more demographic classifications, the product recommendation model configured to output product recommendations for the respective users based on the digital twin images, the one or more phenotype classifications, and the one or more demographic classifications as input;

training, by the one or more processors, an image simulation model on the digital twin images as outputted by the synthetic image generation model and further trained on the product recommendations as outputted by the product recommendation model, the product recommendation model further trained on the one or more phenotype classifications and the one or more demographic classifications, the image simulation model configured to generate simulated images based the digital twin images with one or more graphical enhancements based on the product recommendations, wherein each of the natural language model, the synthetic image generation model, the product recommendation model, and the image simulation model is stored in one or more memories accessible by an application (app) comprising computing instructions stored in the one or more memories, the one or more memories communicatively coupled to the one or more processors; and;

implementing a multiple AI model execution phase comprising:

(a) receiving, by the app, user-specific natural language data of a user, the natural language data defining user-specific phenotype information and user-specific demographic data of the user;

(b) inputting, by the app, the user-specific natural language data into the natural language model, wherein the natural language model generates one or more user-specific phenotype classifications and one or more user-specific demographic classifications defining the user;

(c) inputting, by the app, the one or more user-specific phenotype classifications and the one or more user-specific demographic classifications into the synthetic image generation model, wherein the synthetic image generation model generates a user-specific digital twin image of the user;

(d) inputting, by the app, the user-specific digital twin image of the user, the one or more phenotype classifications of the user, and the one or more demographic classifications of the user into the product recommendation model, wherein the product recommendation model generates a user-specific product recommendation for the user, the user-specific product recommendation designed to address at least one issue identified in the user-specific digital twin image or the one or more user-specific phenotype classifications;

(e) inputting, by the app, the user-specific digital twin image, the user-specific product recommendation, the one or more phenotype classifications of the user, and the one or more demographic classifications of the user into the image simulation model, wherein the image simulation model generates a user-specific simulated image based the user-specific digital twin image and the user-specific product recommendation, the user-specific simulated image graphically depicting the user-specific digital twin image graphically enhanced based on the user-specific product recommendation;

(f) outputting, by the app, natural language data to the user describing the user-specific product recommendation; and (g) displaying, by the app on a display screen, the user-specific simulated image.

17. The AI-based method of claim 16, wherein the one or more phenotype classifications or demographic classifications comprise one or more of: (a) a gender type classification; (b) an age type classification; (c) an ethnicity type classification; or (d) a skin concern type classification.

18. The AI-based method of claim 16, wherein the natural language model comprises a large language model.

19. The AI-based method of claim 16, further comprising an imaging model trained on one or more respective images of the respective users, wherein the imaging model is further configured to output the one or more phenotype classifications corresponding to one or more phenotypes of the respective users, wherein an output of the natural language model and an output of the imaging model is combined to determine the one or more phenotypes of the respective users.

20. A tangible, non-transitory computer-readable medium storing instructions for providing personalized skin product recommendations, that when executed by one or more processors cause the one or more processors to:

implement a multiple AI model training phase comprising:

training, by one or more processors, a natural language model with natural language data and demographic data of respective users, the natural language model configured to output one or more phenotype classifications corresponding to one or more phenotypes of the respective users, and the natural language model further configured to output one or more demographic classifications corresponding to one or more demographic attributes of the respective users;

training, by the one or more processors, a synthetic image generation model on a plurality of images corresponding to the one or more phenotype classifications and the one or more demographic classifications as outputted by the natural language model, the synthetic image generation model configured to output digital twin images of the respective users based on the plurality of images corresponding to the one or more phenotype classifications and the one or more demographic classifications of the respective users as input;

training, by the one or more processors, a product recommendation model on the digital twin images of the respective users as outputted by the synthetic image generation model, the product recommendation model further trained on the one or more phenotype classifications and the one or more demographic classifications, the product recommendation model configured to output product recommendations for the respective users based on the digital twin images, the one or more phenotype classifications, and the one or more demographic classifications as input;

training, by the one or more processors, an image simulation model on the digital twin images as outputted by the synthetic image generation model and further trained on the product recommendations as outputted by the product recommendation model, the product recommendation model further trained on the one or more phenotype classifications and the one or more demographic classifications, the image simulation model configured to generate simulated images based the digital twin images with one or more graphical enhancements based on the product recommendations, wherein each of the natural language model, the synthetic image generation model, the product recommendation model, and the image simulation model is stored in one or more memories accessible by an application (app) comprising computing instructions stored in the one or more memories, the one or more memories communicatively coupled to the one or more processors; and;

implement a multiple AI model execution phase comprising:

(a) receiving, by the app, user-specific natural language data of a user, the natural language data defining user-specific phenotype information and user-specific demographic data of the user;

(b) inputting, by the app, the user-specific natural language data into the natural language model, wherein the natural language model generates one or more user-specific phenotype classifications and one or more user-specific demographic classifications defining the user;

(c) inputting, by the app, the one or more user-specific phenotype classifications and the one or more user-specific demographic classifications into the synthetic image generation model, wherein the synthetic image generation model generates a user-specific digital twin image of the user;

(d) inputting, by the app, the user-specific digital twin image of the user, the one or more phenotype classifications of the user, and the one or more demographic classifications of the user into the product recommendation model, wherein the product recommendation model generates a user-specific product recommendation for the user, the user-specific product recommendation designed to address at least one issue identified in the user-specific digital twin image or the one or more user-specific phenotype classifications;

(e) inputting, by the app, the user-specific digital twin image, the user-specific product recommendation, the one or more phenotype classifications of the user, and the one or more demographic classifications of the user into the image simulation model, wherein the image simulation model generates a user-specific simulated image based the user-specific digital twin image and the user-specific product recommendation, the user-specific simulated image graphically depicting the user-specific digital twin image graphically enhanced based on the user-specific product recommendation;

(f) outputting, by the app, natural language data to the user describing the user-specific product recommendation; and (g) displaying, by the app on a display screen, the user-specific simulated image.

* * * * *